United States Patent
Song et al.

(10) Patent No.: US 10,462,217 B2
(45) Date of Patent: Oct. 29, 2019

(54) PIVOT INTERFACE ELEMENT FOR A MESSAGING SYSTEM

(71) Applicant: Facebook, Inc., Menlo Park, CA (US)

(72) Inventors: Andrew Yaoshu Song, San Francisco, CA (US); Peter Henry Martinazzi, Huntington Beach, CA (US); Alexander Ristevski, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 755 days.

(21) Appl. No.: 14/991,805

(22) Filed: Jan. 8, 2016

(65) Prior Publication Data

US 2017/0201575 A1 Jul. 13, 2017

(51) Int. Cl.
*H04L 29/08* (2006.01)
*H04L 12/58* (2006.01)
*H04W 4/08* (2009.01)

(52) U.S. Cl.
CPC .......... *H04L 67/1059* (2013.01); *H04L 51/16* (2013.01); *H04L 51/38* (2013.01); *H04L 67/26* (2013.01); *H04W 4/08* (2013.01)

(58) Field of Classification Search
CPC . H04L 51/00; H04L 67/1044; H04L 67/1059; H04W 4/08
USPC ................................................ 709/226, 206
See application file for complete search history.

(56) References Cited

U.S. PATENT DOCUMENTS

| | | | | |
|---|---|---|---|---|
| 7,603,413 B1* | 10/2009 | Herold | .................. | G06Q 10/10 455/466 |
| 8,762,462 B1* | 6/2014 | Duddu | .................... | H04L 51/18 709/204 |
| 2005/0149620 A1* | 7/2005 | Kirkland | ................ | G06Q 10/10 709/207 |
| 2009/0094536 A1* | 4/2009 | Keohane | .............. | G06Q 10/107 715/758 |
| 2013/0198297 A1* | 8/2013 | Saabas | ............... | G06Q 10/1095 709/206 |
| 2014/0324997 A1* | 10/2014 | Lee | ......................... | H04L 51/14 709/206 |
| 2016/0117384 A1* | 4/2016 | Akavaram | ........... | G06Q 10/107 707/738 |
| 2016/0196561 A1* | 7/2016 | Iyer | ...................... | G06O 30/016 705/304 |

(Continued)

*Primary Examiner* — June Y Sison
*Assistant Examiner* — Adam A Cooney

(57) ABSTRACT

Exemplary embodiments relate to messaging, and in particular address several aspects of initiating a group conversation. When a user interacts with a messaging system, the system determines whether it is likely that the user intends to start a group conversation or a one-to-one conversation. Intent to start a group conversation can be signaled in a number of ways, such as: type of action requested; interactions with particular UI elements; length of message; analysis of previous user preferences; and analysis of a contacts group. Suggested users to add to the group may be dynamically displayed. The group can be selected in a number of ways, including: analysis of social network information; analysis of events or activities in which the user may be engaged; analysis of user affinities; analysis of the current members of the group; analysis of familial or friend relationships; and analysis of previous messaging activity.

20 Claims, 25 Drawing Sheets

(56) References Cited

U.S. PATENT DOCUMENTS

2017/0005977 A1* 1/2017 Snabl ...................... H04L 51/10
2017/0083210 A1* 3/2017 Parker ..................... H04L 51/04

\* cited by examiner

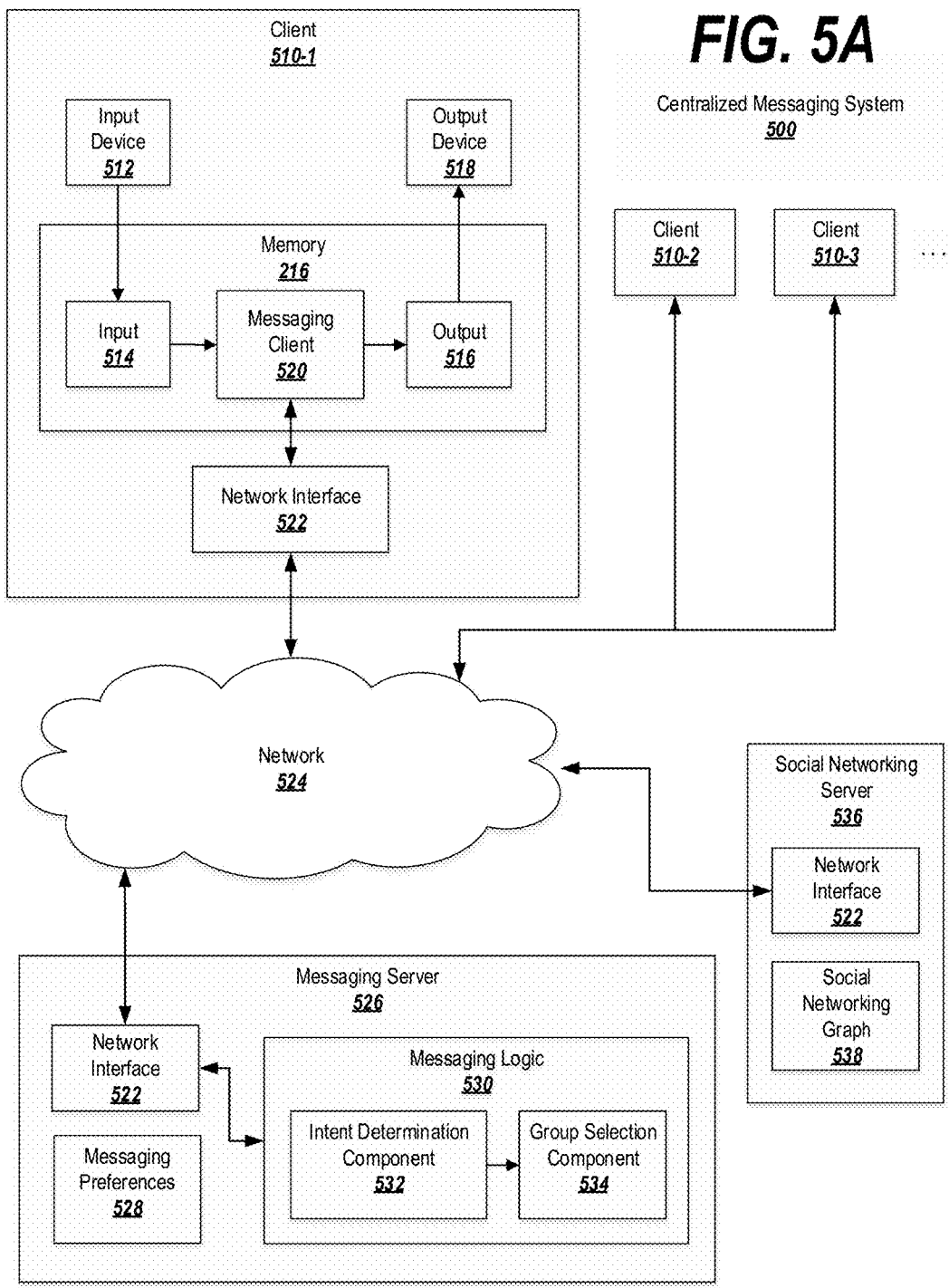

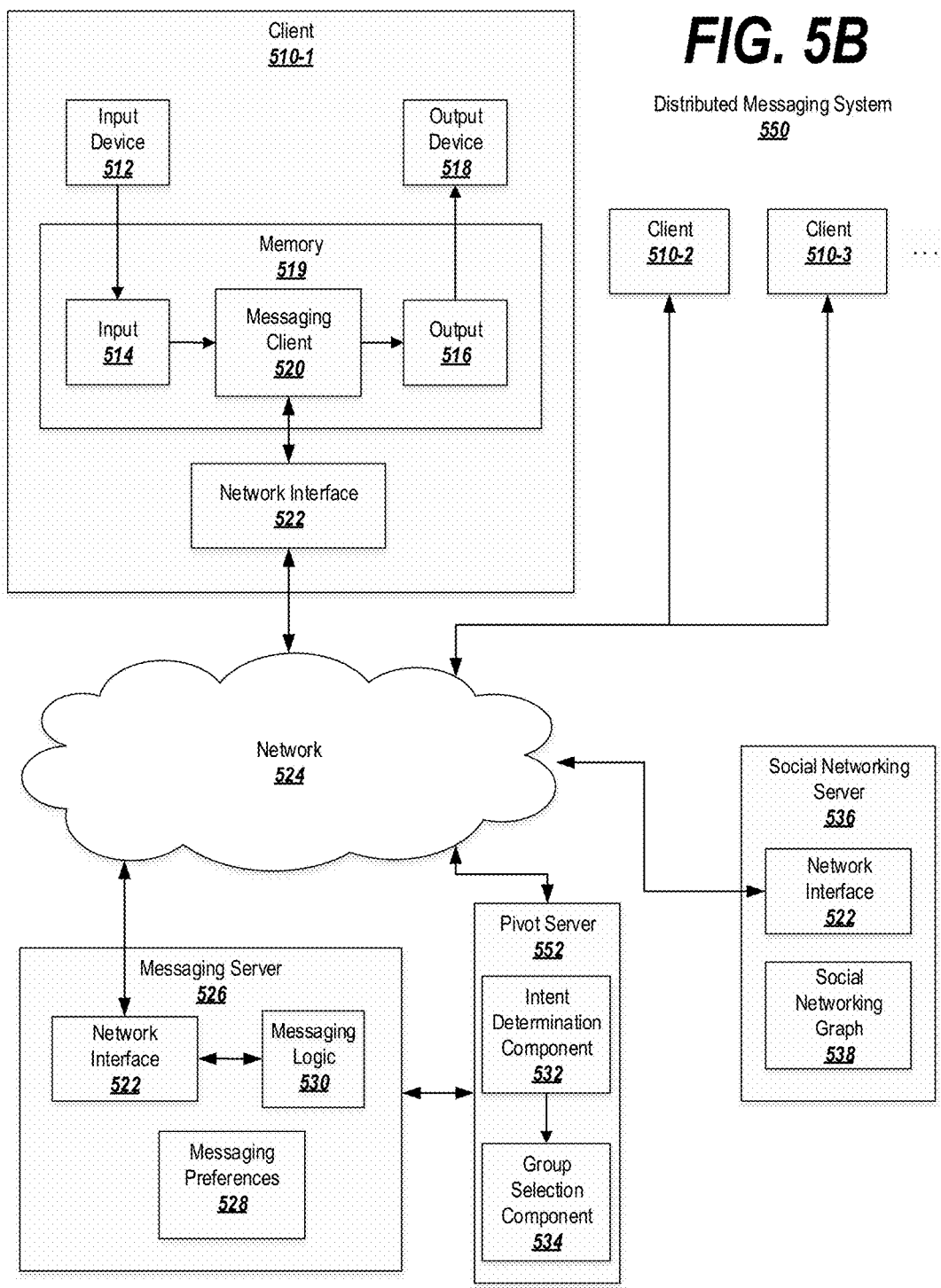

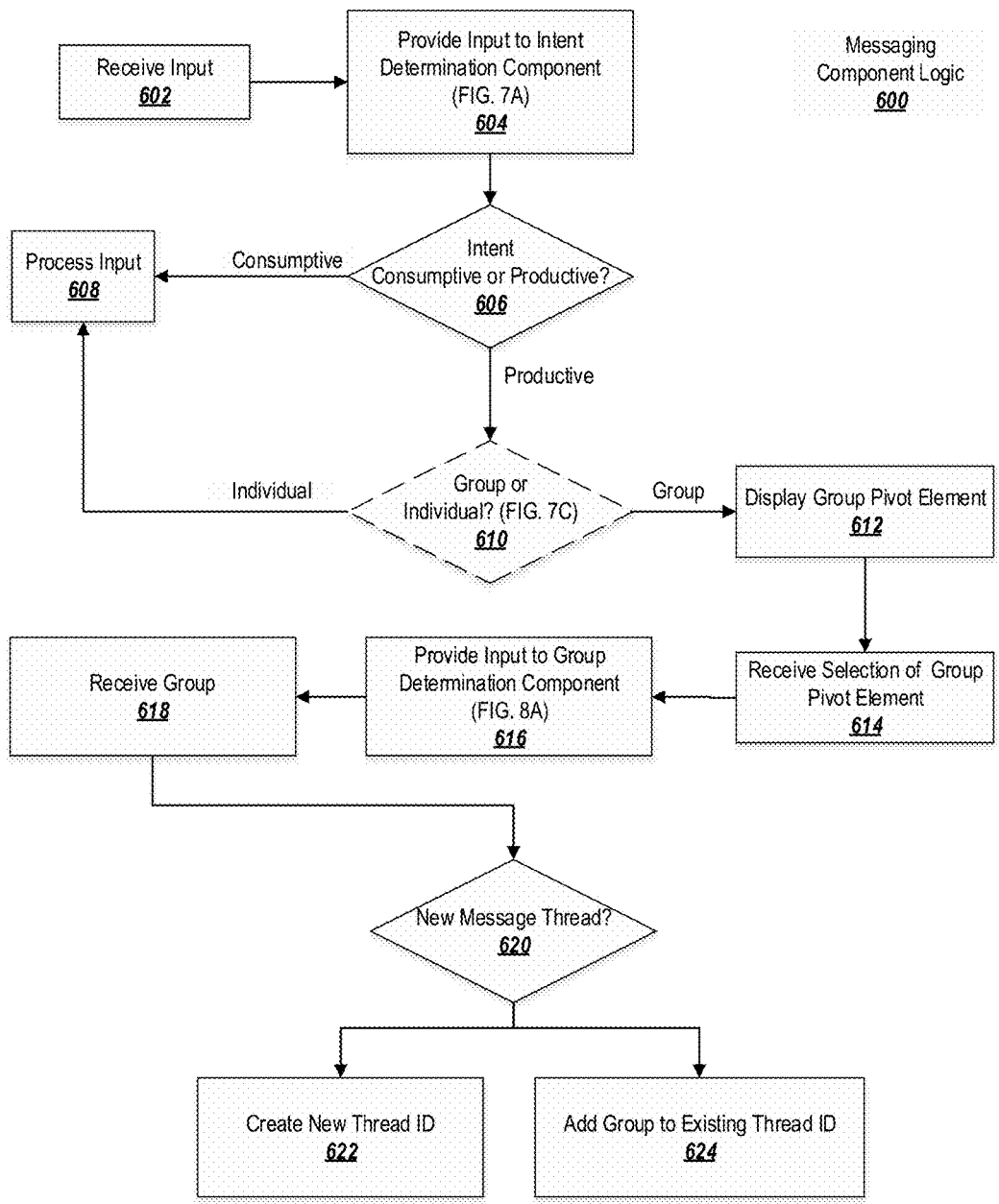

Intent Determination Logic (Cont'd)
700

PIVOT INTERFACE ELEMENT FOR A MESSAGING SYSTEM

BACKGROUND

Messaging systems, such as instant messaging systems and short message service ("SMS") systems, allow users to communicate with each other by exchanging messages. Messaging systems may send messages in different modes depending on how many people are participating in a conversation. For example, in an individual messaging mode, the messaging system connects a first user with a second user for communication on a one-to-one basis. In a group messaging mode, the messaging system connects three or more users together in a group. In the group messaging mode, messages sent by one member of the group a visible to all group members.

SUMMARY

Various embodiments are generally directed to techniques for inferring, during a message creation process, whether a user intends to create a one-to-one message or a group message. If the messaging system determines that the user intends to create a group message, the messaging system presents a pivot user interface element allowing the user to efficiently pivot from the current interface (which may be an interface for creating a one-to-one message) into an interface for creating group messages. A suggested group of recipients of the group message may be automatically determined and presented.

According to exemplary embodiments, methods, mediums, and systems for detecting user intent and/or generating the list of suggested recipients are provided. For example, an input may be received at a messaging system. Information associated with the input may be analyzed to determine that the input is associated with an intent to produce content. In response to determining that the input is associated with the intent to produce content, an instruction to display a pivot interface element may be transmitted to a client. A selection of the pivot interface element may be received, and a group message may be created in response to the receipt of the selection.

In further embodiments, a transmission of an input including content for a group message may be received. Information associated with the input may be analyzed to automatically identify suggested users to participate in the group message. Identifiers for the suggested users may be transmitted to the client.

Other embodiments are also described and claimed.

The preceding presents a simplified summary in order to provide a basic understanding of some novel embodiments described herein. This summary is not an extensive overview, and it is not intended to identify critical elements, or to delineate the scope, of the embodiment. Some concepts are presented in a simplified form as a prelude to the more detailed description that is presented later.

Certain illustrative aspects are described in connection with the annexed drawings. These aspects are indicative of the various ways in which the principles disclosed can be practiced and all aspects and equivalents thereof are intended to be within the scope of the claimed subject matter. Other advantages and novel features will be apparent from the following detailed description when considered in conjunction with the drawings.

BRIEF DESCRIPTION OF THE DRAWINGS

FIG. 5A is a block diagram providing an overview of a system including an exemplary centralized messaging service;

FIG. 5B is a block diagram providing an overview of a system including an exemplary distributed messaging service;

FIG. 6 is a flowchart depicting an exemplary process for identifying a productive or consumptive intent and providing a suggested group of users to participate in a group message;

DETAILED DESCRIPTION

Figure 1A:
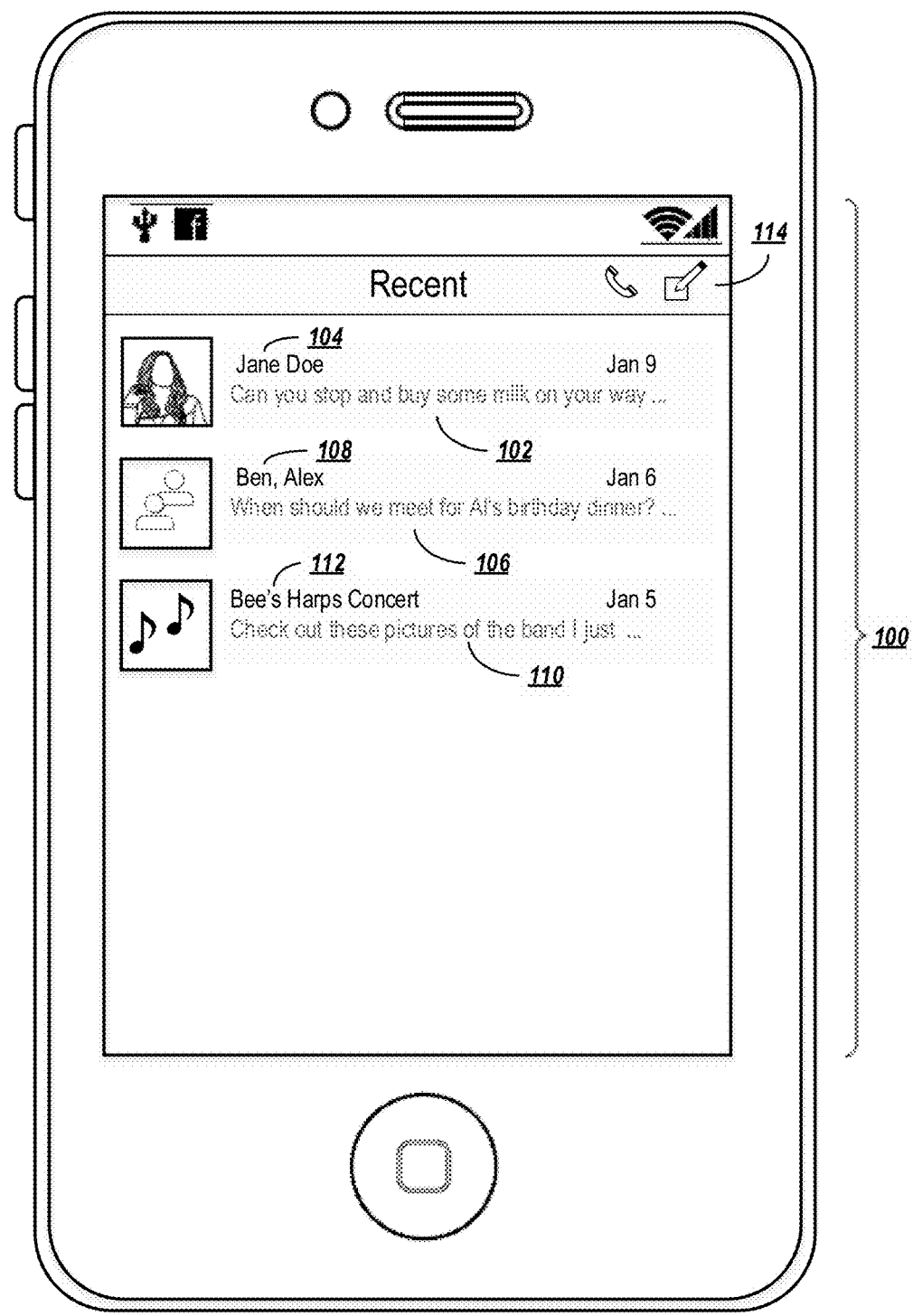
FIG. 1A depicts an exemplary messaging interface including several types of individual and group messages.

Exemplary embodiments described herein pertain to improvements in messaging systems, and in particular address several aspects of detecting an intent to participate in a group conversation, and automatically selecting a group of users to participate in the conversation.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, . . . , 122-a. The embodiments are not limited in this context.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

By selecting an existing message summary 102, 106, 110, the user can view messages in an existing conversation and add new messages to the conversation. Moreover, the interface 100 includes interface elements 114 allowing the user to create a new message.

Figure 1B:
FIG. 1B depicts an exemplary message composition interface.

For example, FIG. 1B depicts an interface 116 displayed by the messaging client application in response to receiving a selection of the "compose" interface element 114. A "new message" window is displayed in the interface 116. The new message window includes a recipient field 118 for allowing the user to manually enter identifiers for one or more recipients. If available, the user's contacts list 120 may also be displayed in the interface 116 in order to simplify the selection of the recipients.

Figure 1C:
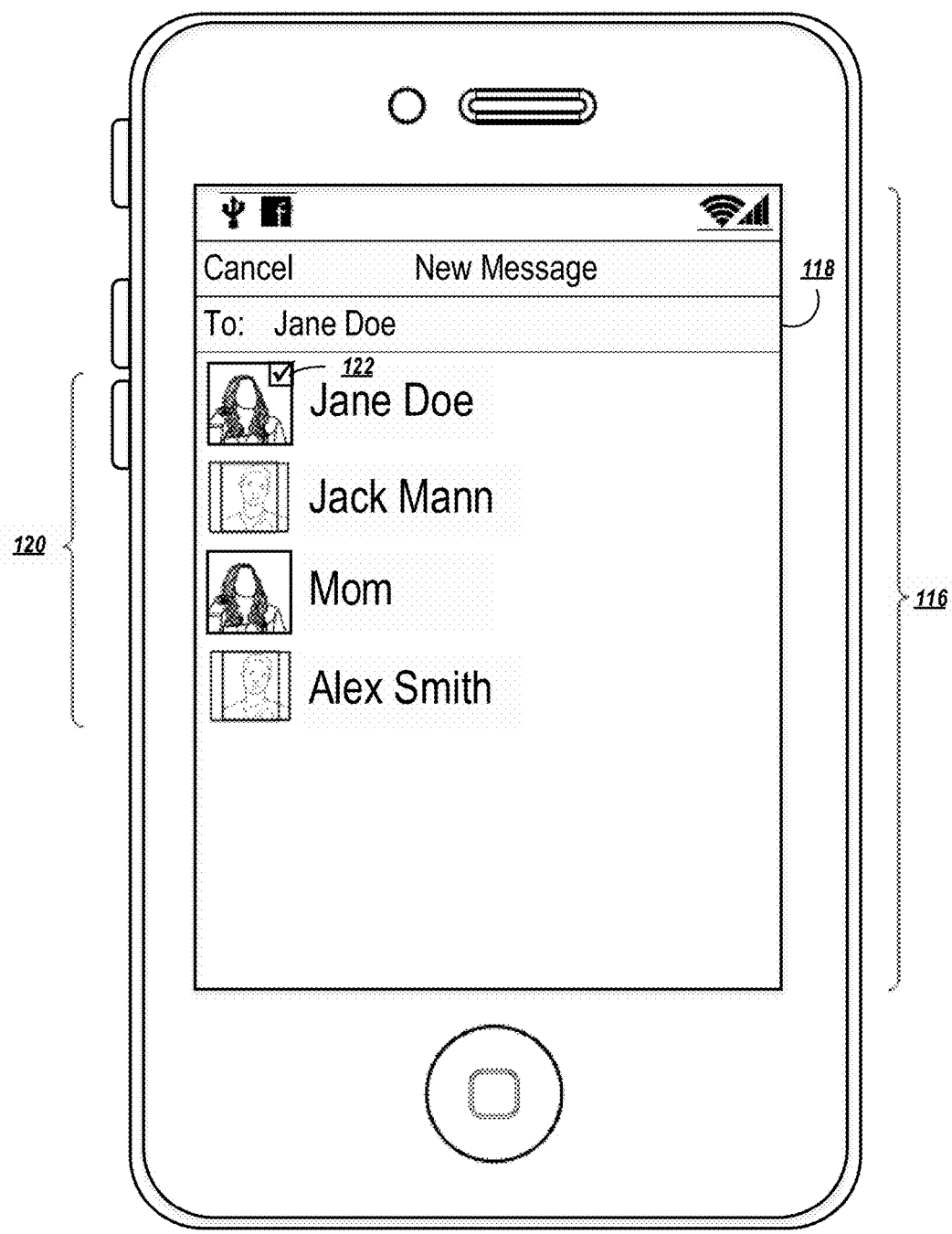
FIG. 1C depicts an example of selecting a recipient of a message in a messaging interface.

In the example of FIG. 1C, the user has entered the identifier of a recipient in the recipient field 118. In order to indicate the recipient's inclusion in the recipients list, a selection indication 122 is displayed on the recipient's icon in the contacts list 120.

Figure 1D:
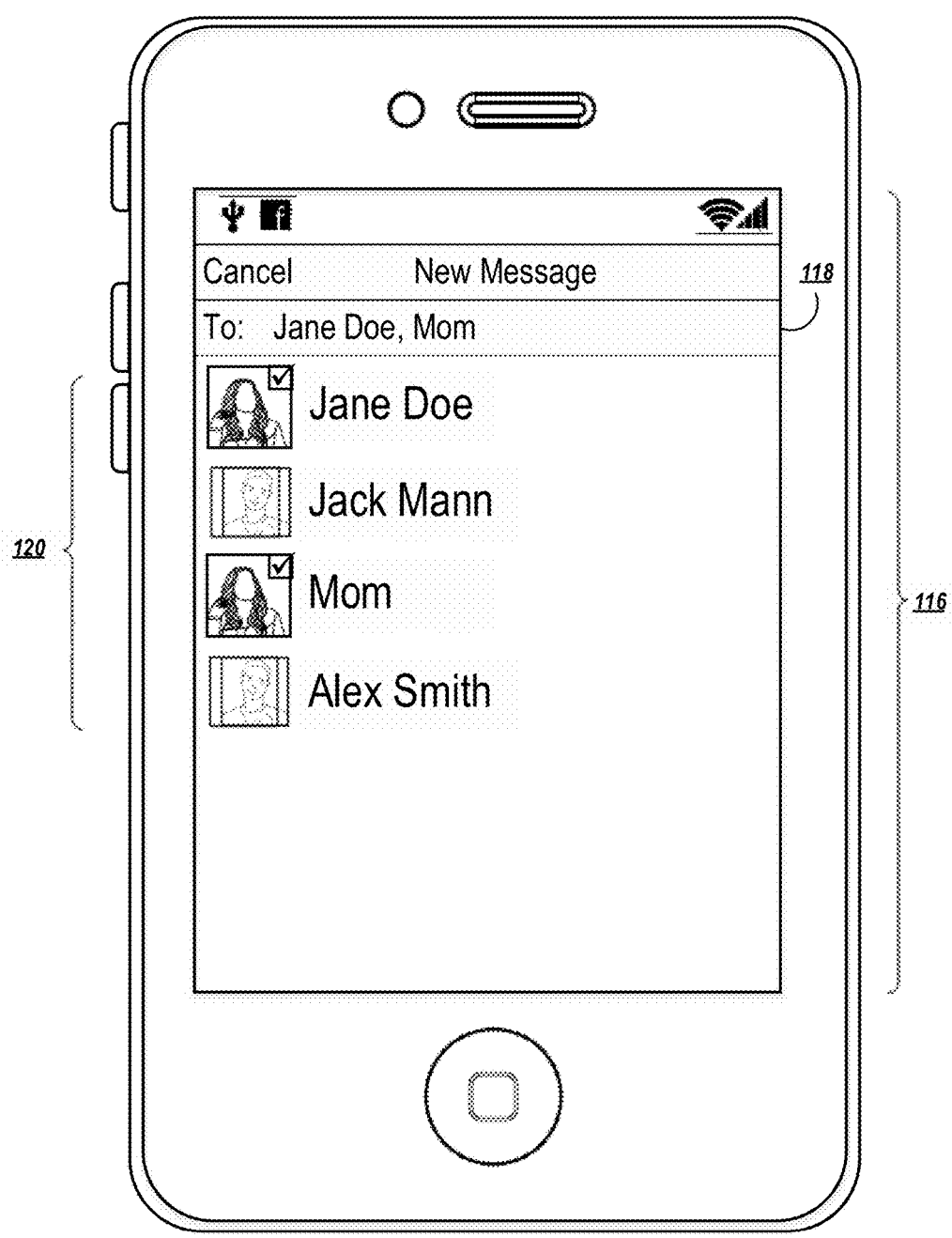
FIG. 1D depicts an example of selecting a group of recipients of a message in a messaging interface.

It is possible to select more than one recipient in the interface 116 to create a group message, e.g. by manually adding multiple recipients in the recipient filed 118, selecting multiple contacts in the contacts list 120, or a combination of methods. FIG. 1D depicts an example of such a group selection.

Exemplary embodiments described in more detail below relate to improved techniques for group selection. When a user interacts with a messaging system, the system attempts to determine whether the user's intent is productive (e.g., the user wishes to create a new message or thread) or non-productive (e.g., the user's intent is to consume information or reply to a previous message). If the intent is productive, a pivot user interface element is shown, which allows the user to efficiently change to a group conversation and select members to add to a group conversation. In some embodiments, if the detected intent is consumptive, the pivot bar does not appear.

Productive intent can be signaled in a number of ways, such as by analyzing a type of action requested, detecting interactions with particular user interface elements, message analysis, analysis of previous user preferences, and analysis of a user's contacts group. Consumptive (non-productive) intent may also be analyzed.

Figure 2A:
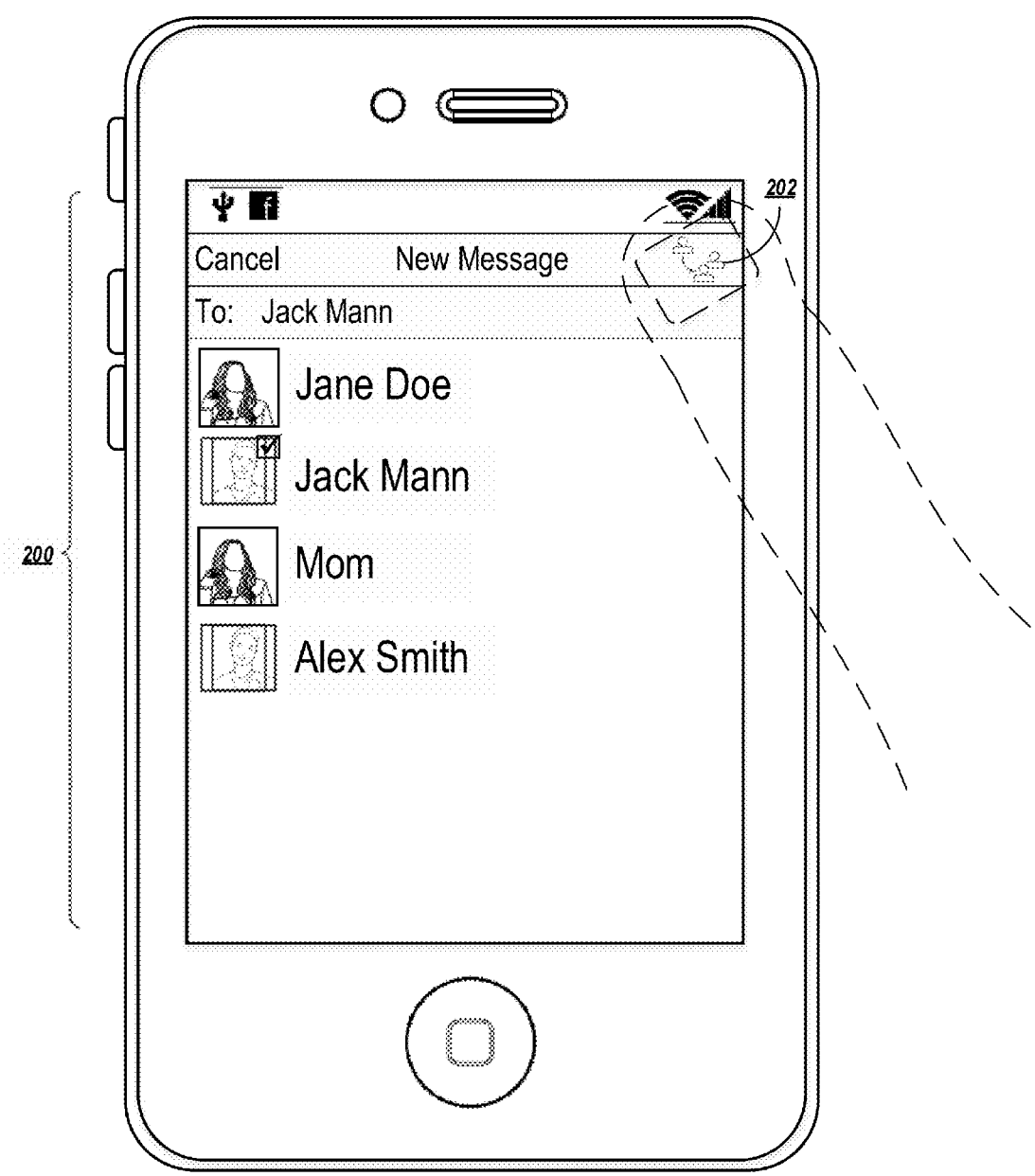
FIG. 2A depicts an alternative example of selecting a recipient of a message in a messaging interface including a pivot interface element.
Figure 2B:
FIG. 2B depicts an example of an interface for suggesting a group of recipients for a group message.

FIG. 2A depicts an example of a user interacting with a pivot user interface element 202 displayed on an interface 200. By interacting with the pivot user interface element 202, a group pivot interface 204 may be presented, as shown in FIG. 2B. The group pivot interface 204 includes a recipients list 206, in which currently-selected recipients are indicated. A suggested group list 208 lists suggested recipients automatically selected from the user's contact list. In the event that a user wishes to include a recipient not present in the group list 208, the user's remaining contacts are displayed in a filtered contacts list 210.

The group list 208 includes a group of suggested users to add to the message and may be dynamically displayed and updated. The group can be selected in a number of ways, including by analysis of social network information, analysis of events or activities in which the user may be engaged, analysis of user affinities, analysis of the current members of the group, analysis of familial or friend relationships, and analysis of previous messaging activity, among other possibilities.

Figure 2C:
FIG. 2C depicts an example of a second type of pivot interface element including a bar of suggested users.
Figure 2D:
FIG. 2D depicts an example of a third type of pivot interface element including a bar of suggested groups.

The pivot interface element 202 depicted in FIGS. 2A and 2B are but two examples of possible pivot interface elements. FIGS. 2C and 2D depict alternative pivot interface elements 212 and 214, respectively. The pivot interface element 212 depicted in FIG. 2C is in the form of a pivot bar that may be displayed, for instance, when the messaging system detects that the user intends to produce a new group message. The pivot interface element 212 includes a list of suggested contacts that the messaging system recommends the user include in the group message. Similarly, the pivot interface element 212 is a pivot bar including a list of user- or messaging-system-defined groups that the messaging system recommends.

Figure 3:
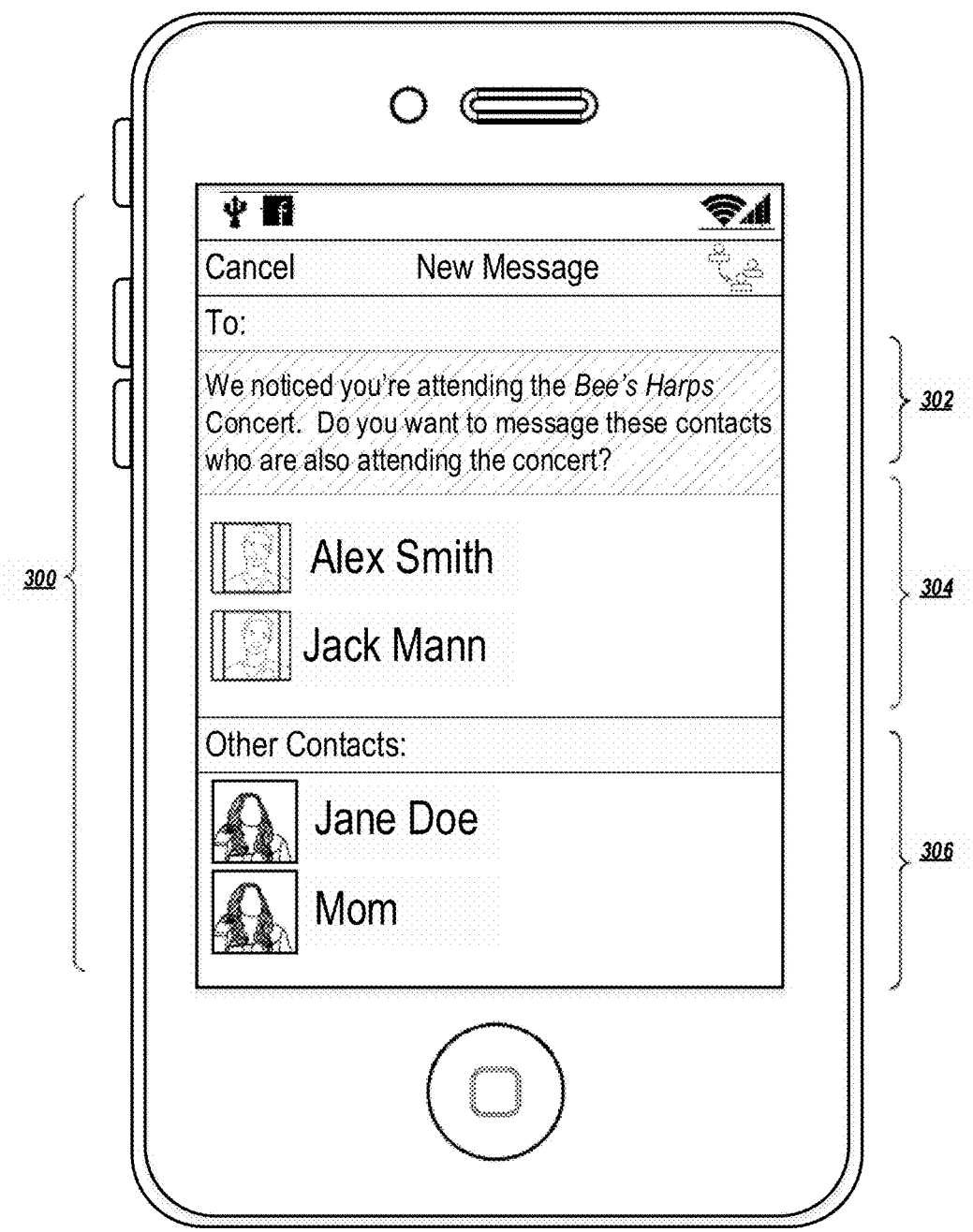
FIG. 3 depicts an example of suggesting a group of message recipients based on calendar and/or location data.

In some embodiments, the group of suggested users may be selected based on an analysis of social networking information, calendar events, and other occurrences, assuming that the user has opted in to providing such information and the user's privacy preferences allow the messaging system to collect it. For example, FIG. 3 depicts an interface 300 displayed when a user begins a message at about the same time that the user's calendar indicates that the user is attending a concert. The interface 300 includes an explanatory field 302 explaining that the system has detected that the user is attending the concert (in addition to calendar events, the system might reference GPS data, social networking pages, electronic invitations, etc.).

A list of recommended recipients 304 is also displayed. The recommended recipients in the list 304 may be selected, for example, by analyzing a social network, the recipients' calendars, the recipients' GPS data or online check-ins, etc. The interface 300 also includes a filtered contacts list 306 that includes the remaining contacts not listed in the recommended recipients list 304.

Figure 4A:
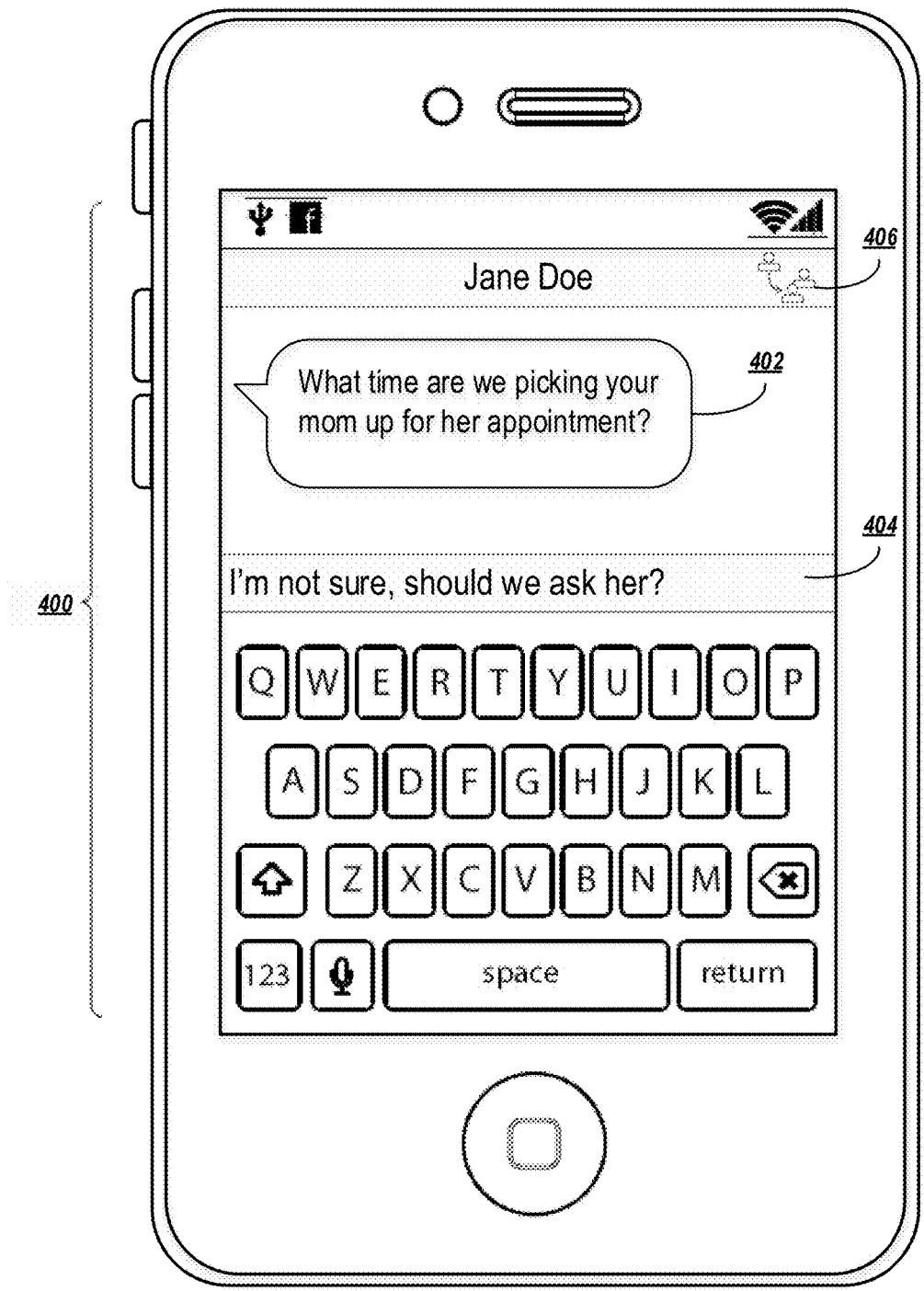
FIG. 4A depicts an example of a message that may trigger a pivot to a group conversation.

In some embodiments, the messaging system may detect that a user intends to shift from a previous one-on-one conversation to a new group conversation. FIG. 4A depicts an example of an interface 400 for a conversation in which the current user (Jack Doe) is participating in a one-on-one conversation with another user (Jane Doe). In this case, Jane has sent a first message 402, which appears in the interface. Jack is in the process of typing a second message 404 that will appear in the interface 400 when Jack transmits the second message 404.

In this example, Jack has opted in to allowing the messaging system to dynamically analyze the content of Jack's messages. As Jack types the second message 404, the system registers that Jack likely intends to switch (or pivot) from a one-on-one conversation with Jane to a group conversation between Jack, Jane, and Jack's mother. As a result of the analysis, the messaging system causes a pivot user interface element 406 to be displayed in the interface 400.

Figure 4B:
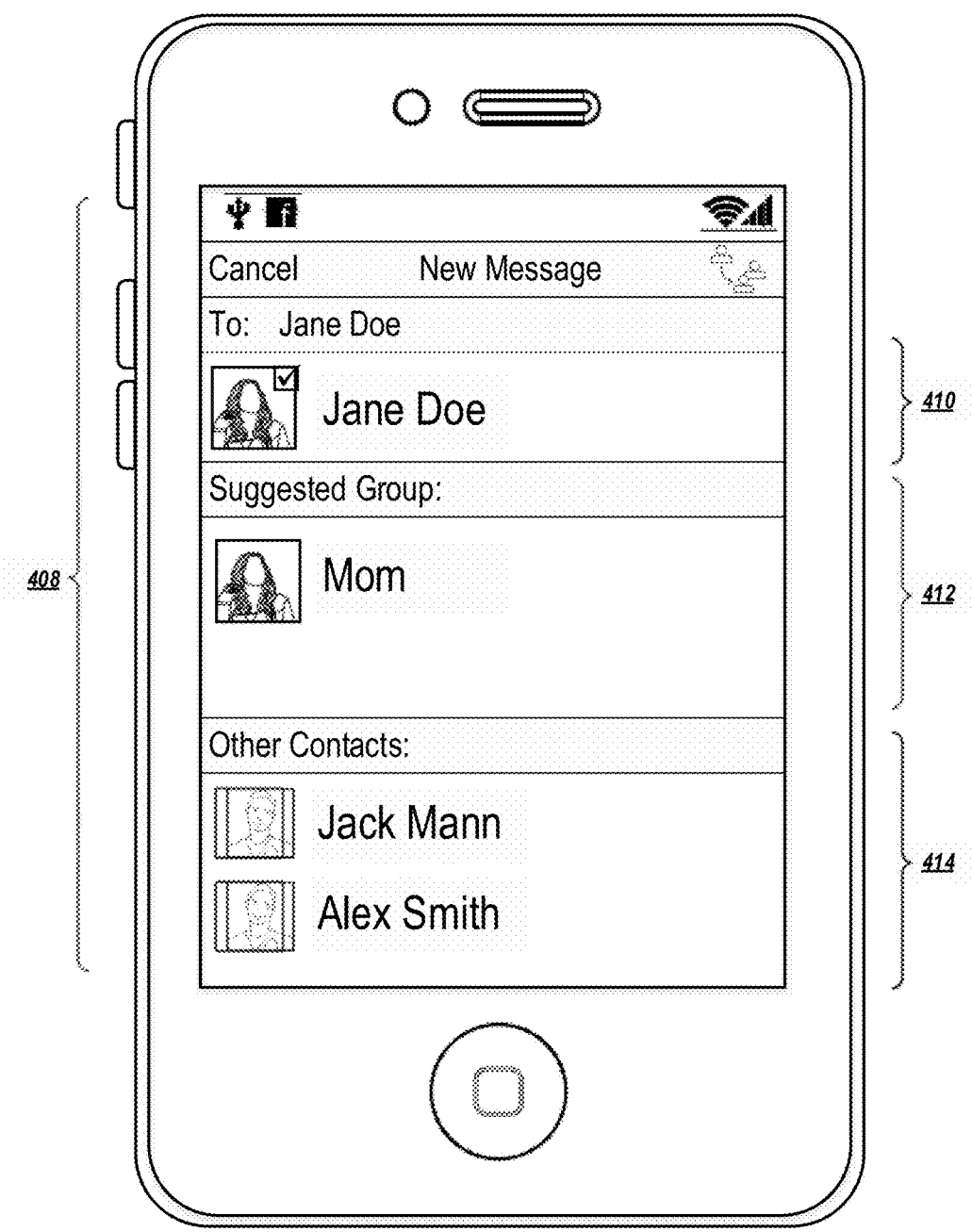
FIG. 4B depicts an example of an interface for selecting additional recipients to participate in the group conversation triggered in FIG. 4A.

Upon receiving a selection of the pivot user interface element 406 from Jack, the messaging system causes a group selection interface 408 to be displayed, as shown in FIG. 4B. The group selection interface includes a list 410 of current recipients, a list 412 of suggested recipients (in this case, selected based on an analysis of the user's message content), and a filtered contacts list 414.

Upon receiving a selection of an additional user ("Mom," in this example), the new user may be added to the conversation. This addition can be achieved in different ways, depending on messaging system and user preferences.

Figure 4C:
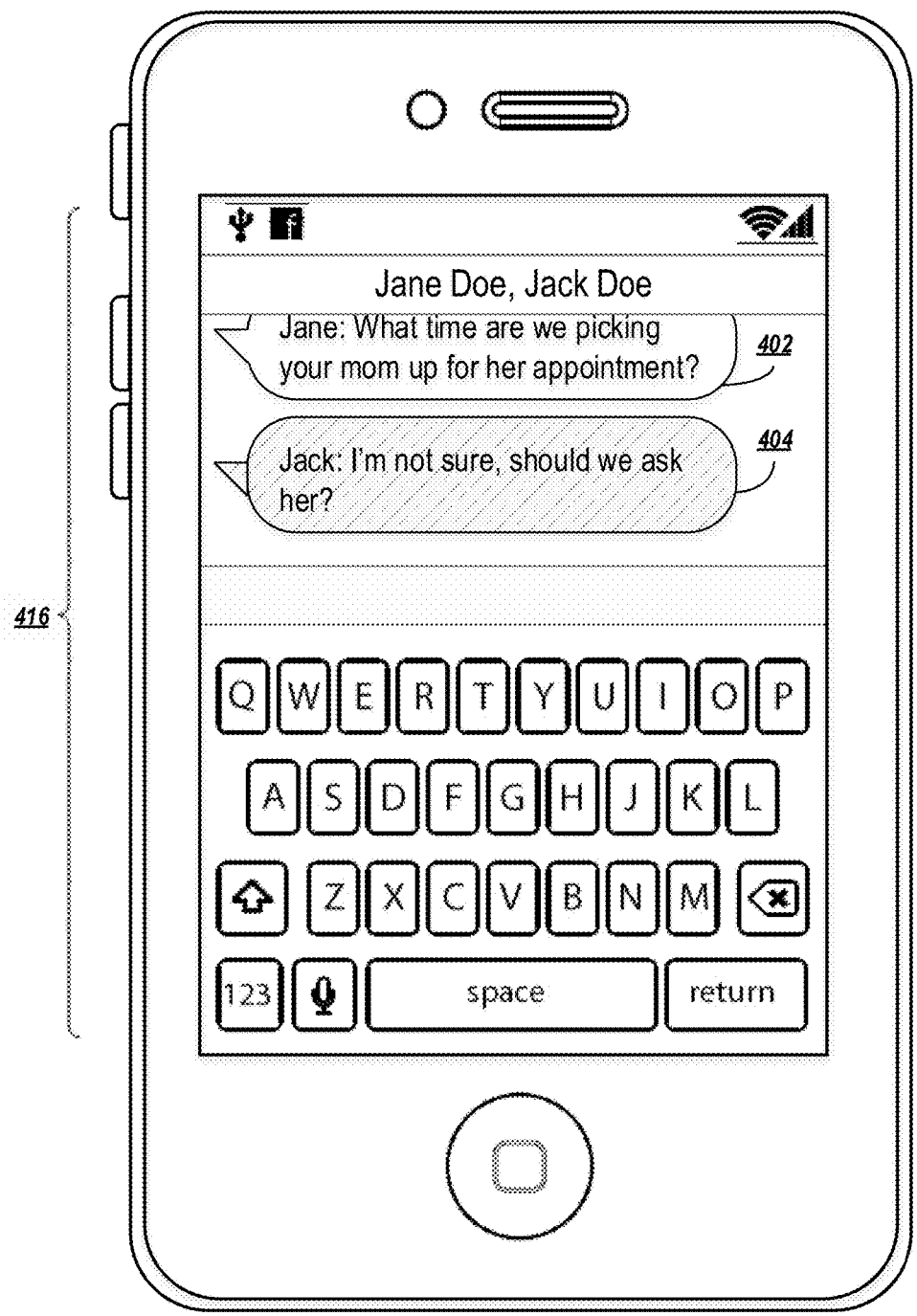
FIG. 4C depicts an example of a conversation history view as seen by the new recipient selected in FIG. 4B according to a first embodiment.

Conversations are generally identified in the messaging system by message threads having message thread identifiers. In embodiments in which a conversation shifts from a one-on-one conversation to a group conversation, the existing thread identifier for the previous one-on-one conversation may retained. The new users may be added to the existing message thread, which allows the new users to view previous messages in the conversation. This is referred to as a canonical implementation of message threads. An example of an interface 416 shown to the new user in a canonical implementation is shown in FIG. 4C. The interface 416 displays to the new user the previous conversation history, including the first message 402 and the second message 404.

In further embodiments, the current thread ID may be substituted for another existing thread ID. The substituting thread ID may be, for example, a thread ID that has already been assigned to the current users plus the newly-added user. In the above example, the messaging system may search among thread IDs to identify a conversation that consists of Jack, Jane, and Mom (e.g., an earlier conversation in which Jack, Jane, and Mom were the participants). Once Mom is added to the group conversation, future messages may be sent to a conversation associated with the thread ID that included Jack, Jane, and Mom.

Figure 4D:
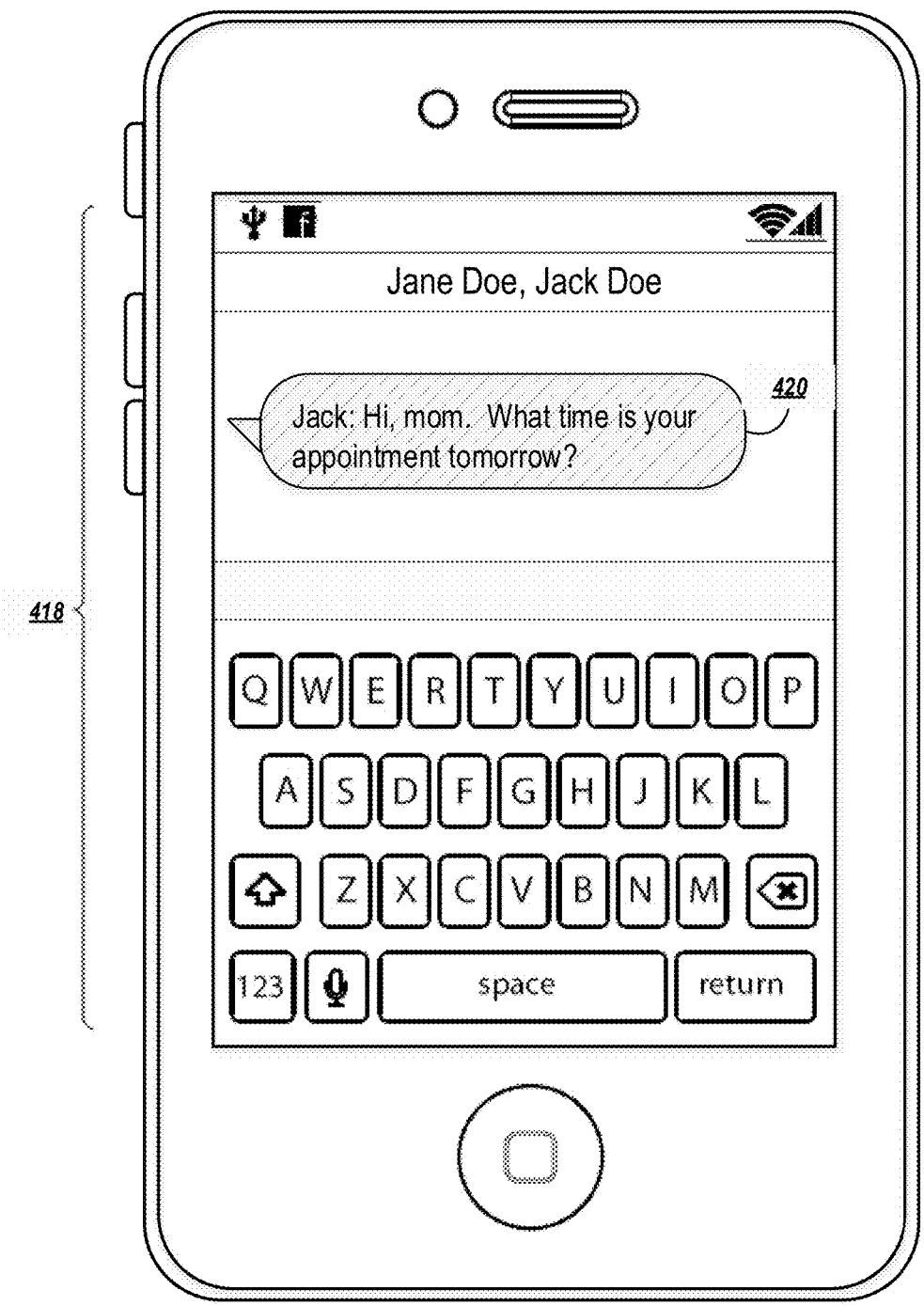
FIG. 4D depicts an example of a conversation history view as seen by the new recipient selected in FIG. 4B according to a second embodiment.

Alternatively, a new message thread may be created with a new thread ID, which causes an empty conversation to be generated. This is referred to as a non-canonical implementation, an example of which is depicted in FIG. 4D. As shown, an interface 418 is presented in which the previous conversation (e.g., the messages 402 and 404) is not displayed. In some cases, it may be necessary to generate a new message in the new conversation before anything will be sent to the newly-created group. In this example, a third message 420 sent during the creation of the group is displayed in the interface 418.

The use of a canonical implementation or a non-canonical implementation may depend on privacy settings for the conversation and/or the participants in the conversation. As a brief introduction, a note on data privacy is next provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of a messaging system is now provided Messaging System Overview FIG. 5A depicts an exemplary centralized messaging system 500, in which functionality for recognizing productive intent and generating a list of suggested recipients is integrated into a messaging server. The centralized system 500 may implement some or all of the structure and/or operations of a messaging service in a single computing entity, such as entirely within a single centralized server device 526.

The messaging system 500 may include a computer-implemented system having software applications that include one or more components. Although the messaging system 500 shown in FIG. 5A has a limited number of elements in a certain topology, the messaging system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the messaging system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the messaging system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a messaging server 526. The messaging server 526 may be operative to receive, store, and forward messages between messaging clients.

The messaging server 526 may include a network interface 522, messaging preferences 528, and messaging logic 530. The messaging preferences 528 may include one or more privacy settings for one or more users and/or message threads. For example, the messaging preferences 528 may include a setting that indicates whether to create new conversations using a canonical or non-canonical implementation when pivoting from a one-on-one to a group conversation. Furthermore, the messaging preferences 528 may include one or more settings, including default settings, for the logic described herein.

The messaging logic 530 may include an intent determination component 532 that is operable to evaluate an input to determine whether the input indicates a productive or a consumptive intent. The intent determination component 532 is discussed in more detail in connection with FIGS. 7A-7C.

The messaging logic 530 may further include a group selection component 534 that is operable to automatically select a suggested set of users to join in a group conversation. The group selection component 534 is discussed in more detail in connection with FIGS. 8A-8B.

In some embodiments, messages may be sent peer-to-peer between users without the use of intervening server devices such as may implement the messaging service 500. In these embodiments, the messaging logic 530, including the intent determination component 532 and the group selection component 534, may reside on the client devices 510.

The network interface 522 of the client 510 and/or the messaging server 526 may also be used to communicate through the network 524 with a social networking server 536. The social networking server 536 may include or may interact with a social networking graph 538 that defines connections in a social network. Furthermore, the messaging server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social-networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans;

extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for pivoting to a group conversation (e.g., the logic of the intent determination component 532 and/or the logic of the group selection component 534) are incorporated into the messaging server 526. In contrast, FIG. 5B depicts an exemplary distributed messaging system 550, in which functionality for recognizing productive intent and generating a list of suggested recipients is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate pivot server 552, which hosts the intent determination component 532 and the group selection component 534. The pivot server 552 may be distinct from the messaging server 526 but may communicate with the messaging server 526, either directly or through the network 524, to provide the functionality of the intent determination component and the group selection component 534 to the messaging server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the messaging server 526 may have limited resources (e.g. processing or memory resources) that limit or preclude the addition of the additional pivot functionality. In such situations, the capabilities described herein may still be provided through the separate pivot server 552.

Figure 5C:
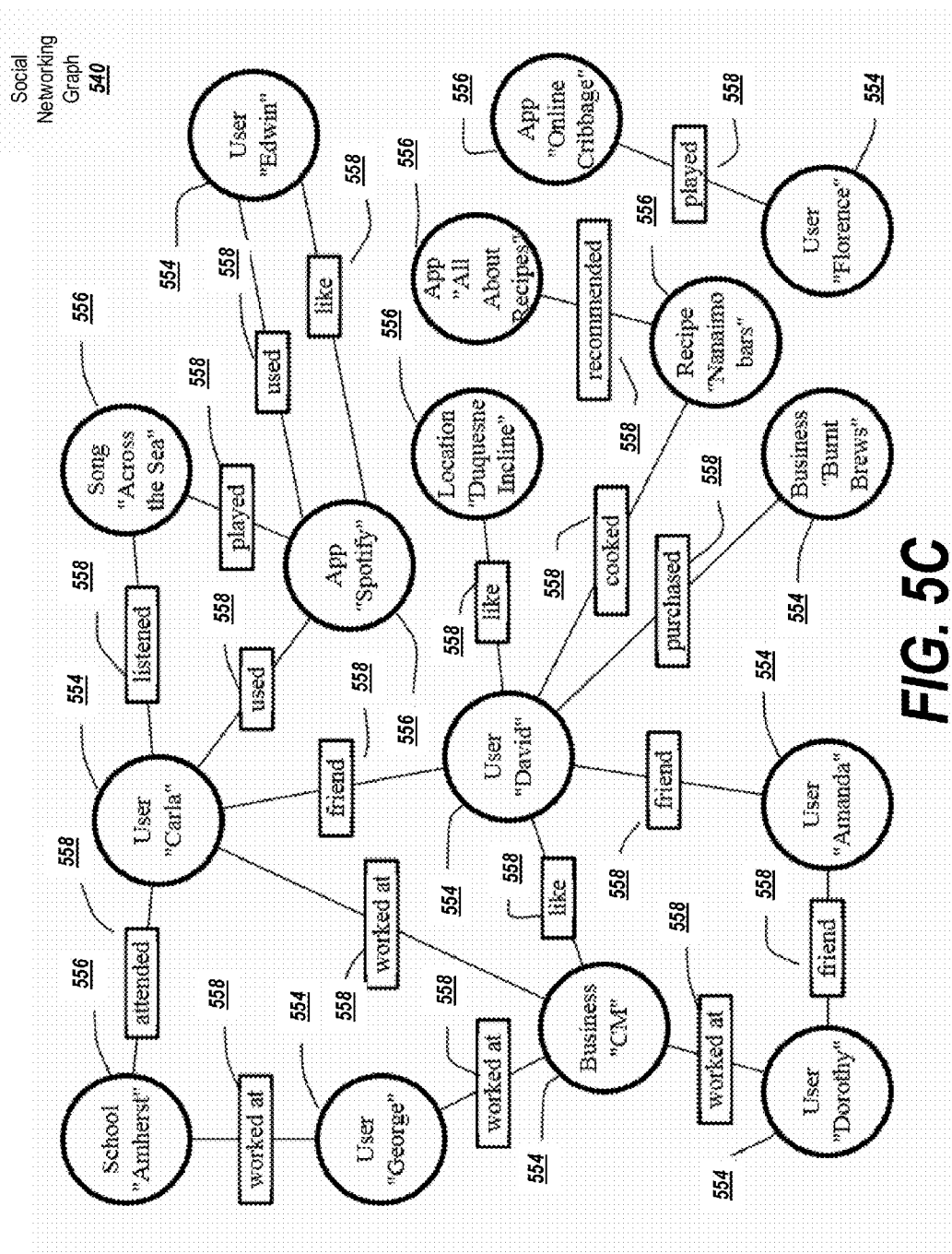
FIG. 5C depicts the social networking graph of FIGS. 5A and 5B in more detail.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

Next, logic for evaluating productive intent and selecting suggested group members is described.

Pivoting Logic

FIGS. 6-8B are a set of flowcharts depicting exemplary logic for performing novel aspects of the disclosed architecture. While, for purposes of simplicity of explanation, the methodologies shown herein may be described as a series of acts, it is to be understood and appreciated that the methodologies are not limited by the order of acts, as some acts may occur in a different order and/or concurrently with other acts from that shown and described. For example, those skilled in the art will understand that a methodology could alternatively be represented as a series of interrelated states or events, such as in a state diagram. Moreover, not all acts illustrated may be required for an implementation.

FIG. 6 is a flowchart depicting an exemplary process performed by messaging component logic 600 for identifying a productive or consumptive intent and providing a suggested group of users to participate in a group message.

It is noted that this process may be performed dynamically, e.g. as information is entered via the input device 512.

At step 602, the messaging server 526 may receive an input from a client 510. The input may be in the form of a command, a request, a message including content, etc. At step 604, the input is provided to the intent determination component 532 to determine whether the input is associated with a productive or a consumptive intent. Step 604 is described in more detail in connection with FIGS. 7A-7B.

At step 606, the output of the intent determination component 532 is analyzed to determine whether the intent is consumptive or productive. For example, the intent determination component 532 may calculate a productive score and/or a consumptive score based on a variety of factors that are used to indicate whether the intent of the input is more productive or more consumptive. At step 606, the scores may be compared to determine which score is higher.

If the intent is determined to be consumptive, then processing proceeds to step 608, where the input is processed as normal. In this case, the messaging system 500 may refrain from causing the client 510 to display a pivot user interface element.

If the intent is determined to be productive, then processing may optionally proceed to step 610, where the productive intent is further evaluated to determine whether it is considered likely that the user intended to produce content for an individual conversation, or for a group conversation. Step 610 is described in more detail in connection with FIG. 7C.

If it is determined that the intent is to produce individual content, then processing may proceed to step 608 and the input may be processed as normal. In this case, the messaging system 500 may refrain from causing the client 510 to display a pivot user interface element.

If, on the other hand, it is determined that the input is associated with an intent to produce content for a group, processing proceeds to step 612 and the messaging server 526 may transmit an instruction to the client 510 instructing the client 510 to display the pivot user interface element.

In response to selecting the group pivot element at the client 510, at step 614 the messaging server 526 may receive an indication that the group pivot element has been selected. At step 616, the input may be provided to the group selection component 534 to select a group of suggested recipients for the message. Step 616 is described in more detail in connection with FIGS. 8A-8B.

At step 618, the messaging server 526 may receive the group of suggested recipients as an output of the group selection component 534. The group may be, for example, a list of contacts in the contacts list of an originator of the input received at step 602. At step 618, the messaging server 526 may transmit the suggested group members to the client 510 and instruct the client 510 to display the suggested group members in an interface.

At step 620, the messaging server 526 may determine whether to create a new message thread. If there is not currently a message thread associated with the input received at step 602 (i.e., the input is associated with new activity or a new conversation), then processing may proceed to step 622 and the messaging server 526 may create a new tread identifier for use with a new messaging thread.

If there is currently a message thread associated with the input received at step 602 (e.g., the input is associated with a one-to-one conversation which is being converted to a group conversation), then the messaging server 526 may consult the messaging preferences 528 associated with each user in the conversation and/or associated with the conversation itself. If the messaging preferences 528 indicate that the group conversation should be treated as a new conversation, then processing may proceed to step 622 and a new thread ID may be created.

On the other hand, if the messaging preferences 528 indicate that new members should be added to the existing conversation without creating a new message thread, then processing may proceed to step 624 and the group members selected by the user may be added to the existing thread. Alternatively or in addition, the messaging preferences 528 may indicate that an existing group conversation should be re-used, if available. If so, then the messaging system may search among the thread IDs that are assigned to the conversation participants to identify whether any thread IDs match the group of participants identified at step 618. If a match is found, the thread ID associated with the match may be used as the thread ID for the group conversation. New messages will appear as a continuation of the previous conversation among the group members.

Returning to step 604, FIG. 7A is a flowchart depicting an exemplary process performed by intent determination logic 700 for identifying productive or consumptive intent based on a type of request. The pivot user interface element may be displayed dynamically based on a determination that the user intends to produce a new conversation, such as a new message. If the user intends to consume material without creating a new conversation, which could include reading a message or sending a short reply in an existing conversation, then the messaging server 526 may refrain from causing the client 510 to display the pivot user interface element.

The process generally operates by examining factors considered to be indicative of an intent to produce and factors considered to be indicative of an intent to consume. A productive score and a consumptive score are both initialized to zero. As factors indicative of productive intent are encountered, the productive score is increased at steps marked 708. As factors indicative of consumptive intent are encountered, the consumptive score is increased at steps marked 718. The score increases may be weighed depending on how much the factor is considered to indicate consumptive or productive intent. In some embodiments, rather than incrementing the productive or consumptive scores, the respective scores could be lowered when contrary factors are encountered.

At step 702, an input may be received. At step 704, a type of the input may be evaluated. The intent determination logic 700 is not limited to processing message data, may be provided with inputs of many different types in order to better evaluate productive and consumptive intent.

For example, if the input is a request to access a groups tab of the messaging client (step 706), this may be indicative of a productive intent. The groups tab includes a list of group members that the user of the messaging client has created, or that have been created automatically. Typically, when a user accesses the groups tab, the user is preparing to say something to the group, which may be indicative of productive intent. Accordingly, the productive score may be increased at step 708.

Similarly, if the input is a request to compose a new message (step 710), this is highly indicative of productive intent. The productive score may be increased at step 708.

If the input is a request to access a message thread (step 712), this may be indicative of a productive intent or a consumptive intent. If the user is accessing a thread with unread messages (step 714), it may be determined whether the message thread belongs to a group that has recently been active on the thread (step 716). If the group has not been recently active, then the user's intent is likely productive (i.e., the user is likely attempting to say something new to the group and start a new conversation). In this case, it is more likely that the user is about to create a new message rather than read old content; it has been found that users who intend to read old content on a group message thread typically access such messages through a search, rather than by accessing the thread (step 712). Therefore, the productive score may be increased at step 708.

On the other hand, if the group did have recent activity ("YES" at step 716), then the user is likely attempting to reply to the recent messages on the thread. This signals a consumptive, rather than productive, intent because the user does not intend to create a new conversation. Therefore, the consumptive score may be increased at step 718.

If the user accessed the thread (step 712) through a push notification (step 720), such as a push notification received on a lock screen of a mobile device, then it is likely that the user's intent is to read, and potentially reply to, a recently-received message. The consumptive score may be increased at step 718.

Similarly, if the request is a request to reply to a message (step 722), then this likely signals consumptive intent (step 718). Not all messages sent in an existing conversation are necessarily considered replies. In exemplary embodiments, a message is considered a reply if the message is sent within a predetermined amount of time after the previous message in the conversation (e.g., about three hours). If the next message in the conversation is sent after the predetermined period of time, then this may be treated as a request to compose a new message (step 710).

If the request is a request to conduct a search (step 724), then this likely signals consumptive intent (step 718). For example, if the user searches for a contact (step 726) or for a previous message (728), then the user is likely to be looking for information rather than producing new material.

Figure 7A:
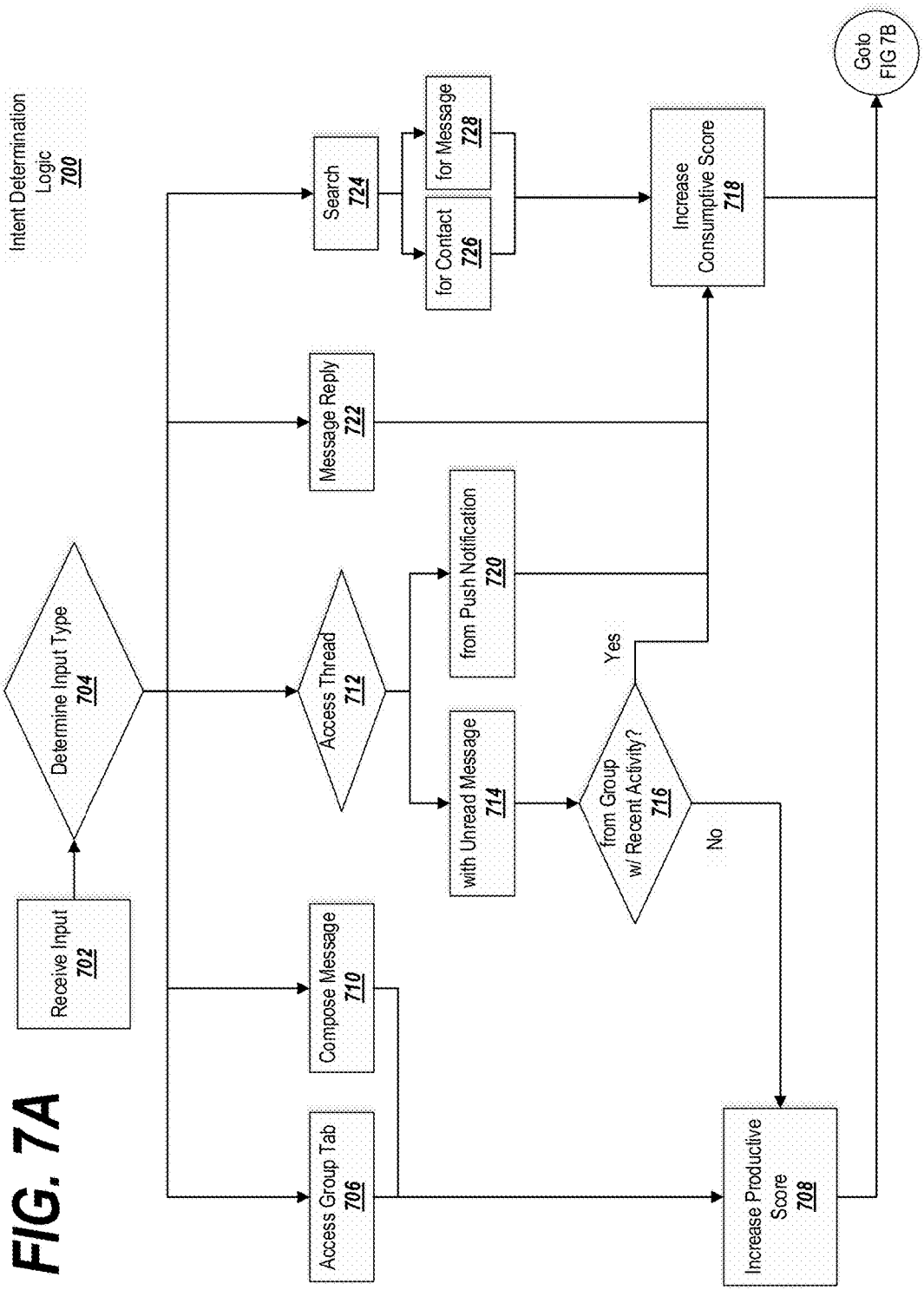
FIG. 7A is a flowchart depicting an exemplary process for identifying productive or consumptive intent based on a type of request.

Of course, the list presented in FIG. 7A is not exhaustive, and there may be numerous other types of inputs. One of ordinary skill in the art will recognize that these different types of inputs may also be evaluated to determine whether they signal productive or consumptive intent.

Figure 7B:
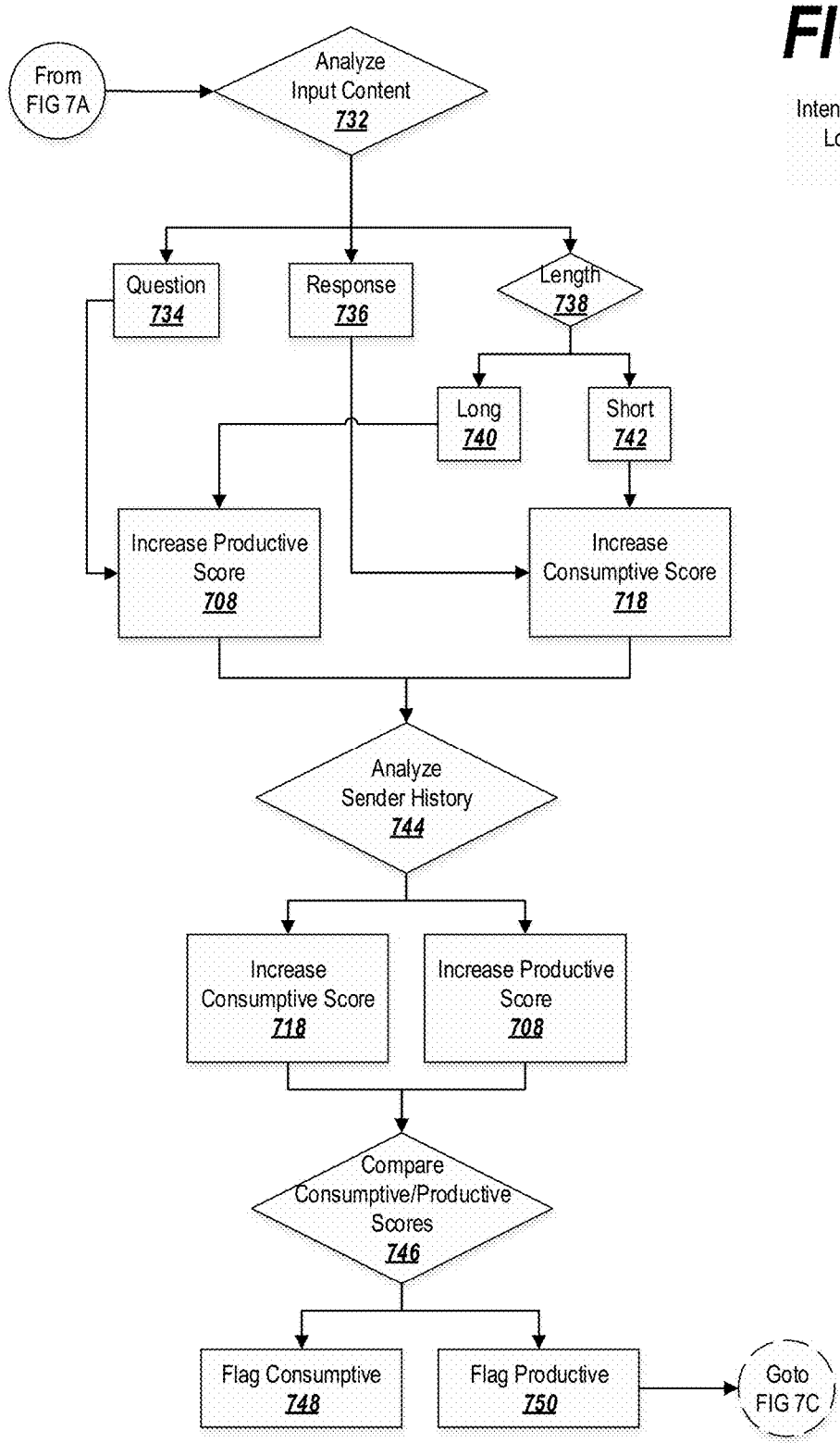
FIG. 7B is a flowchart depicting an exemplary process for identifying productive or consumptive intent based on input content and sender history.

Once the input type is analyzed, processing may proceed to FIG. 7B. FIG. 7B is a flowchart depicting an exemplary process performed by the intent determination logic 700 for identifying productive or consumptive intent based on input content and sender history.

At step 732, content associated with the input may be analyzed to determine whether the content suggests a productive or consumptive intent. For example, if the input is a message, then a payload of the message may be analyzed at step 732. If the input content is in the form of a question (step 734), this may signal a productive intent (step 708), more so than if the input content includes a response to a question (step 736). Similarly, the length of the message may be analyzed. A short message (step 742) may designate a reply, whereas a longer message (740) may designate the start of a new conversation.

At step 744, the sender's messaging history may be analyzed. This may be a customized or personalized analysis that evaluates how the sender has, in the past, entered into new conversations. If any of previous factors that preceded the start of a new conversation are present in connection with the new input, then the productive score may be increased. On the other hand, if inputs similar to the current input have signaled consumptive intent in the past, then the consumptive score may be increased.

At step 746, the consumptive and productive scores may be totaled and compared to each other. If the consumptive score is higher than the productive score, indicating a likelihood that the user is not attempting to create a new conversation, then the system may set a flag indicating consumptive intent (step 748). If the productive score is higher than the consumptive score, then a productive flag may be set (step 750).

Figure 7C:
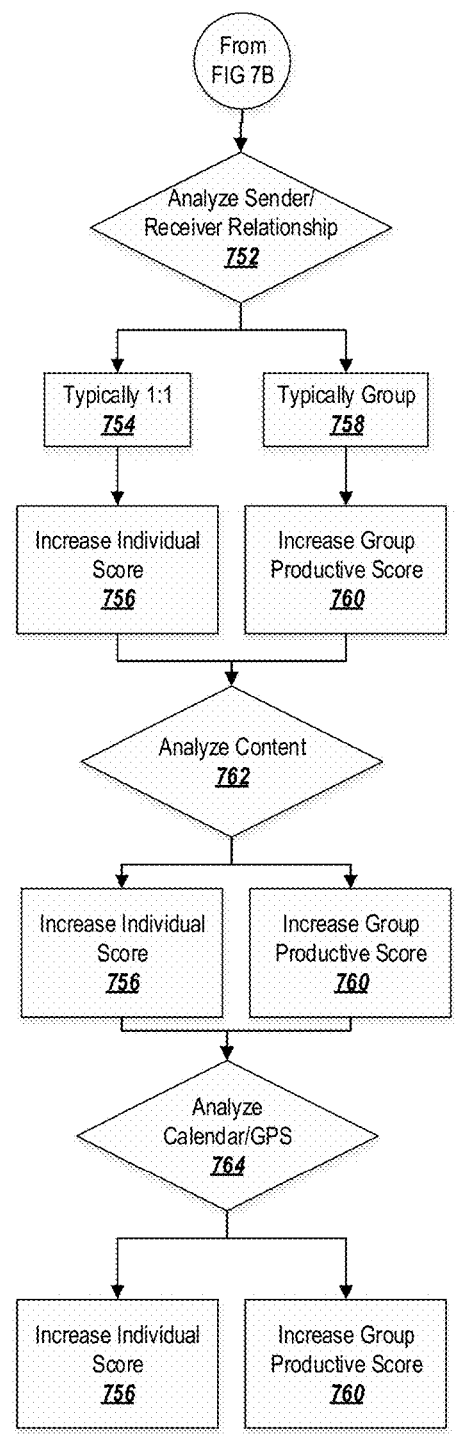
FIG. 7C is a flowchart depicting an exemplary process for identifying whether a productive intent is an intent to produce content for a group or an intent to produce content for an individual.

Processing may then optionally proceed to FIG. 7C. FIG. 7C is a flowchart depicting an exemplary process performed by the intent determination logic 700 for identifying whether a productive intent is an intent to produce content for a group or an intent to produce content for an individual. If the intent is to produce content for an individual, then it is not necessary to present a UI element for pivoting to a group conversation, nor to select recommended group users for receiving the content. To that end, an individual productive score and a group productive score may be maintained (steps 756 and 760, respectively), in a similar manner to the consumptive and productive scores of FIGS. 7A-7B.

At step 752, the logic 700 may examine an input message to analyze the sender's relationship to an indicated recipient of the message. Message histories, profile information, relationship status, and other factors may be used to determine whether the sender typically messages the receiver on a one-to-one basis (step 754), or in a group setting (step 758). If the sender is more likely to message the receiver individually (e.g., messages between spouses), then the individual productive score may be increased (step 756). If the sender is more likely to message the receiver in a group setting, then the group productive score may be increased (step 760).

At step 762, the content of the message may be analyzed. The content may indicate that the sender is likely to be creating a group message (as in the example of FIG. 4A), or might indicate a message that the sender intends to be private or sent on an individual basis. Analyzing message content is, of course, subject to the privacy settings of the user generating the message content.

At step 764, the user's calendar and/or GPS may be consulted. For example, if the user is scheduled to attend an event with a group of people, and messages a member of the group in the vicinity of the event, then it may be likely that the user intends to create a group message. On the other hand, if a user messages his wife on their anniversary, this may be indicative of an intent to create an individual message.

Figure 8A:
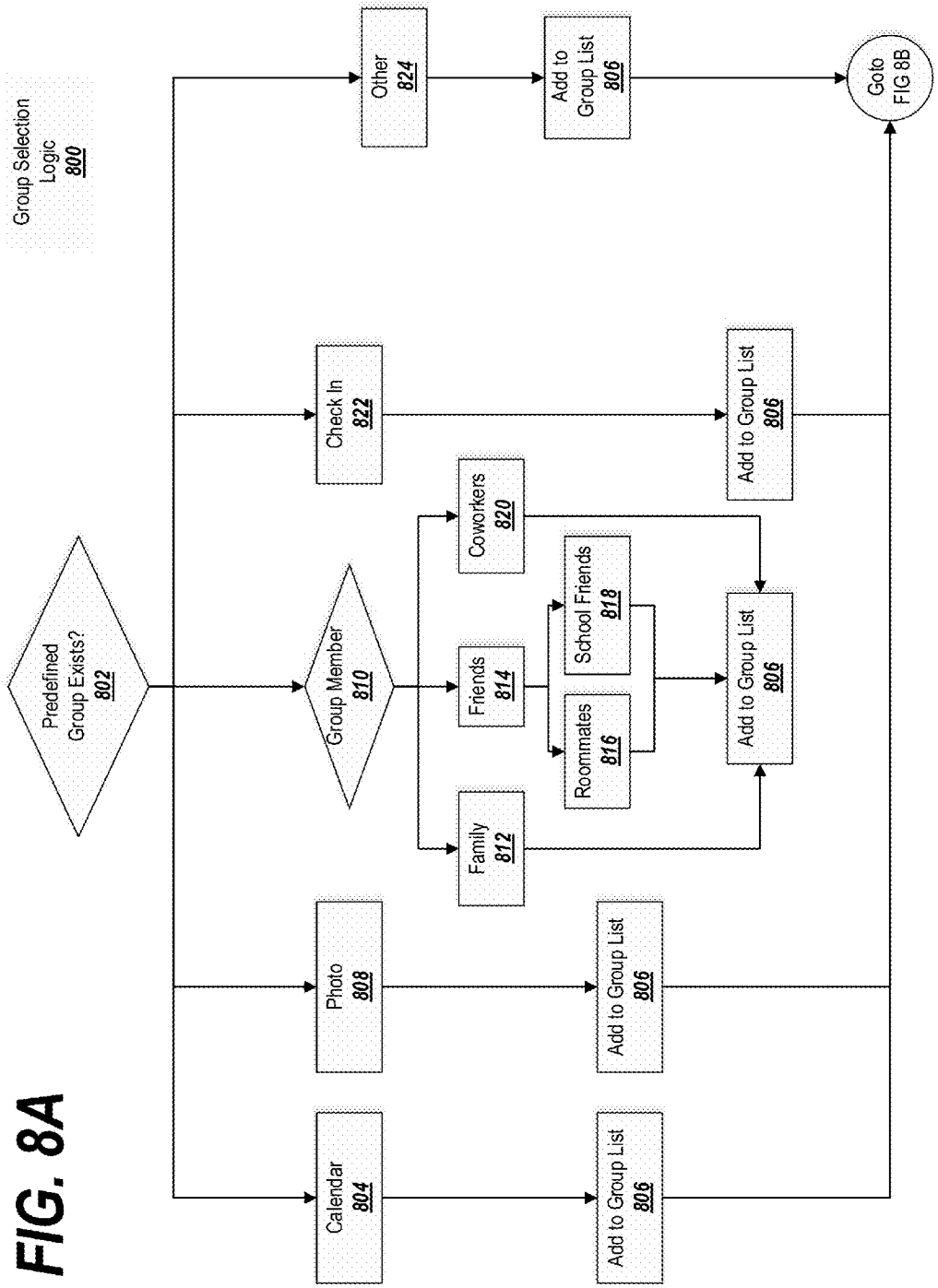
FIG. 8A is a flowchart depicting an exemplary process for selecting a group of users to participate in a group message based on predetermined user groups.

Once it is determined that the user intends to message a group, suggested members of the group may be automatically selected by the messaging server 526. FIG. 8A is a flowchart depicting an exemplary process performed by group selection logic 800 for selecting a group of users to participate in a group message based on predetermined user groups.

At step 802, the logic 800 may determine whether an applicable predetermined group exists. For example, if the user's calendar indicates that the user is participating in an event with a group of people (step 804), then the group participating in the event may be added to a suggested group list at step 806. Similarly, if the user's social networking page or an electronic information service includes information about events that the user will be attending, then the attendees of the event may be cross-referenced to the user's contact list. Any members of the users contact list that are also attending the event may be added to the group list.

If the user is commenting on a photo (step 808), then any people tagged in the photo may be retrieved and added to the group list.

If the user is messaging at least one member of a group (step 810), such as a family group (812), a friends group (814), which could be further subdivided into smaller groups such as roommates 816, school friends 818, etc., or a coworkers group (820), then the members of the group may be added to the group list. In some cases, the presence of an existing group may cause some members to be removed from the group list when the system determines that the groups should not overlap (or a user has set a comparable privacy setting to prevent group overlap). For example, if the system determines that a message is likely intended for the user's roommates 816 based on available information in the input, but the user's coworkers 820 have also been added to the list of suggested group members, then the coworkers 820 may be removed from the list.

If the user checked-in (step 822) at a location through a social networking service, electronic review service, or location-based service, then any other users with whom the user checked in may be added to the group list.

Of course, other predefined groups (824) may exist and will be apparent to those of ordinary skill in the art.

Figure 8B:
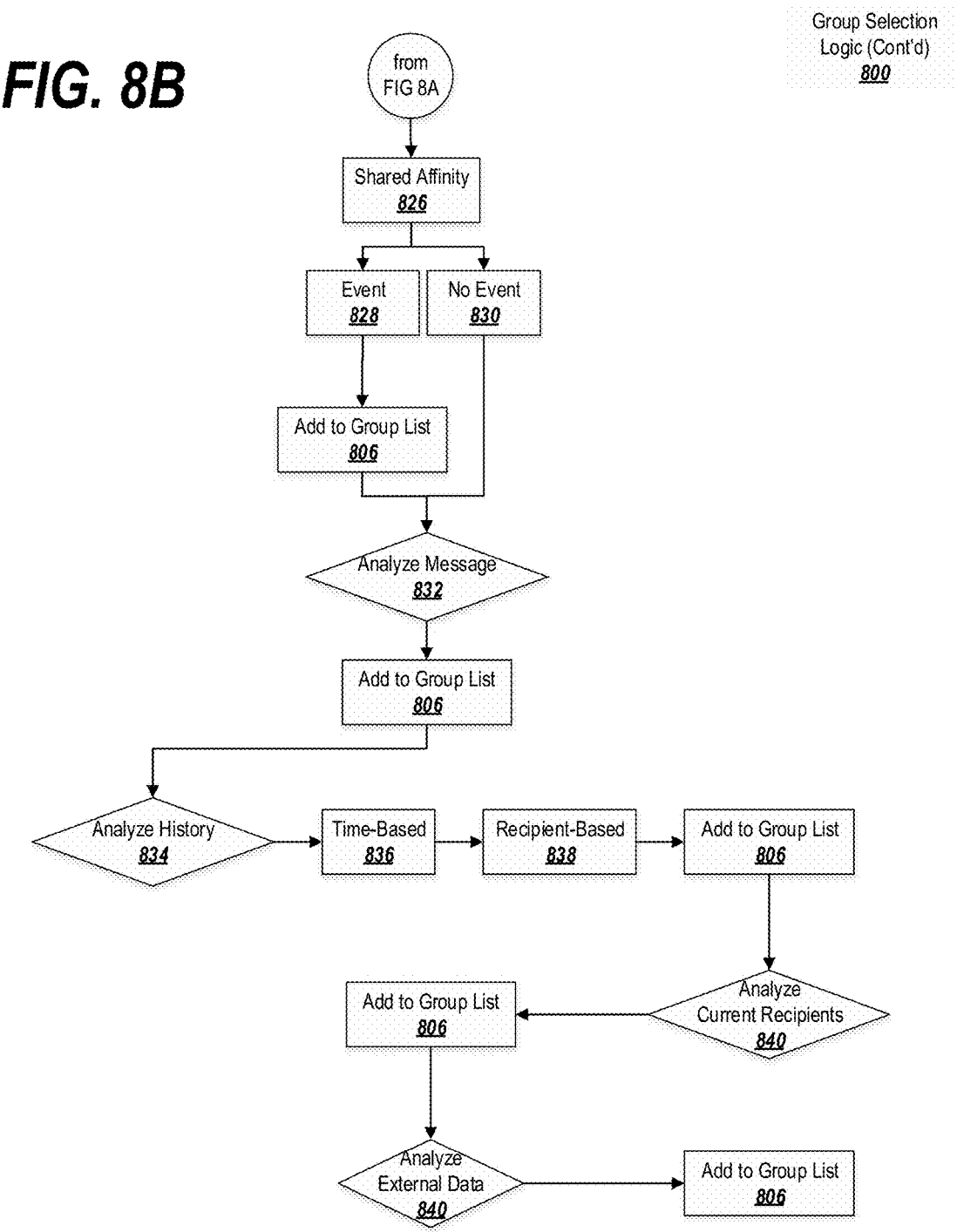
FIG. 8B is a flowchart depicting an exemplary process for selecting a group of users to participate in a group message based on shared affinity, message content, messaging history, current message recipients, and mobile messaging.

After evaluated predefined groups in FIG. 8A, non-predefined groups may be considered in FIG. 8B. FIG. 8B is a flowchart depicting an exemplary process performed by group selection logic 800 for selecting a group of users to participate in a group message based on shared affinity, message content, messaging history, current message recipients, and mobile messaging.

At step 826, the logic 800 considers shared affinities between the user and members of the user's contacts list. In one embodiment, if an event is currently occurring (step 828), any other users interested in the event may be added to the group list. For example, if the sending user is a Blue Jays fan and is sending a message during a Blue Jays game, then other Blue Jays fans, or people from Toronto, may be added to the group list.

At step 832, the message may be analyzed to determine whether the message content suggests a user to add to the list (as in the example of FIG. 4A).

At step 834, the user's history may be analyzed. For example, a time-based analysis may be carried out at step 836 to determine if the user regularly messages a specified group of other users at certain times of the day, week, month, year, etc. Perhaps, for instance, the user typically messages their carpool at a certain time of the morning, or messages their family on major holidays.

At step 838, a history of recipients that the user has messaged in the past may be analyzed. For example, if the user has regularly messaged the same recipients, those recipients may be added to the group list.

At step 840, the logic 800 may dynamically analyze the recipients to which the message is currently addressed. Based on the people already in the message, the logic 800 may determine whether other recipients should likely be included. For example, if the user adds two of their roommates to a message, the user's third roommate might be added to the group list.

At step 840, the logic 800 may analyze external data to find additional users to add to the group list. The external data may include, for example, message histories on a social network separate and distinct from the messaging client 820, messages sent through the user's simple message service (SMS) system on a mobile device, relationships and other data obtained from a social network or mobile device, etc.

Any users found in the external analysis may be cross-referenced against the user's contacts list, and matching contacts may be added to the group list.

The group list may be provided to the messaging server 526, which may send identifiers of suggested users to the originator of the message. The originator's messaging client 520 may display an interface allowing some or all of the suggested users to be added to a group conversation.

Messaging Architecture

Figure 9:
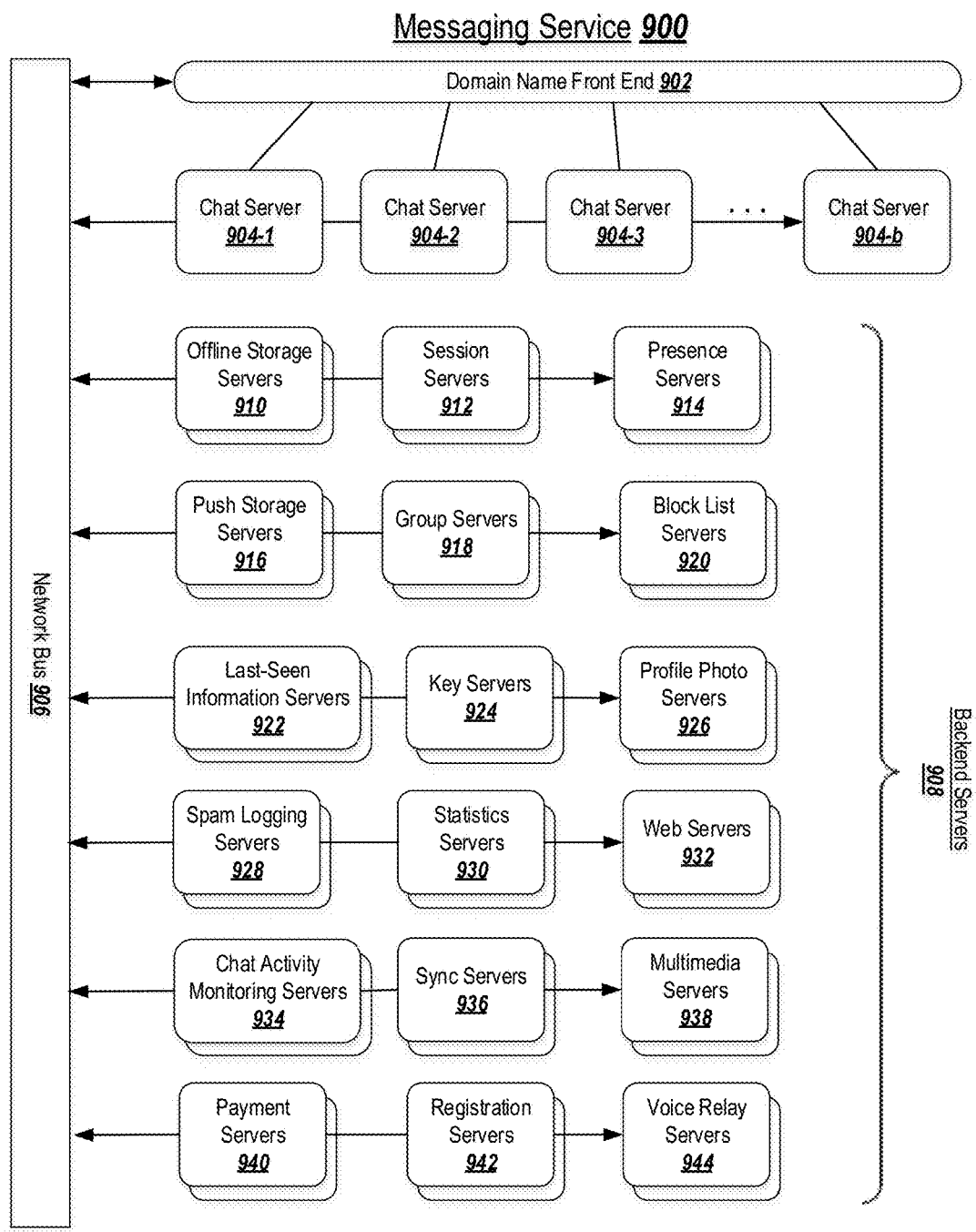
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
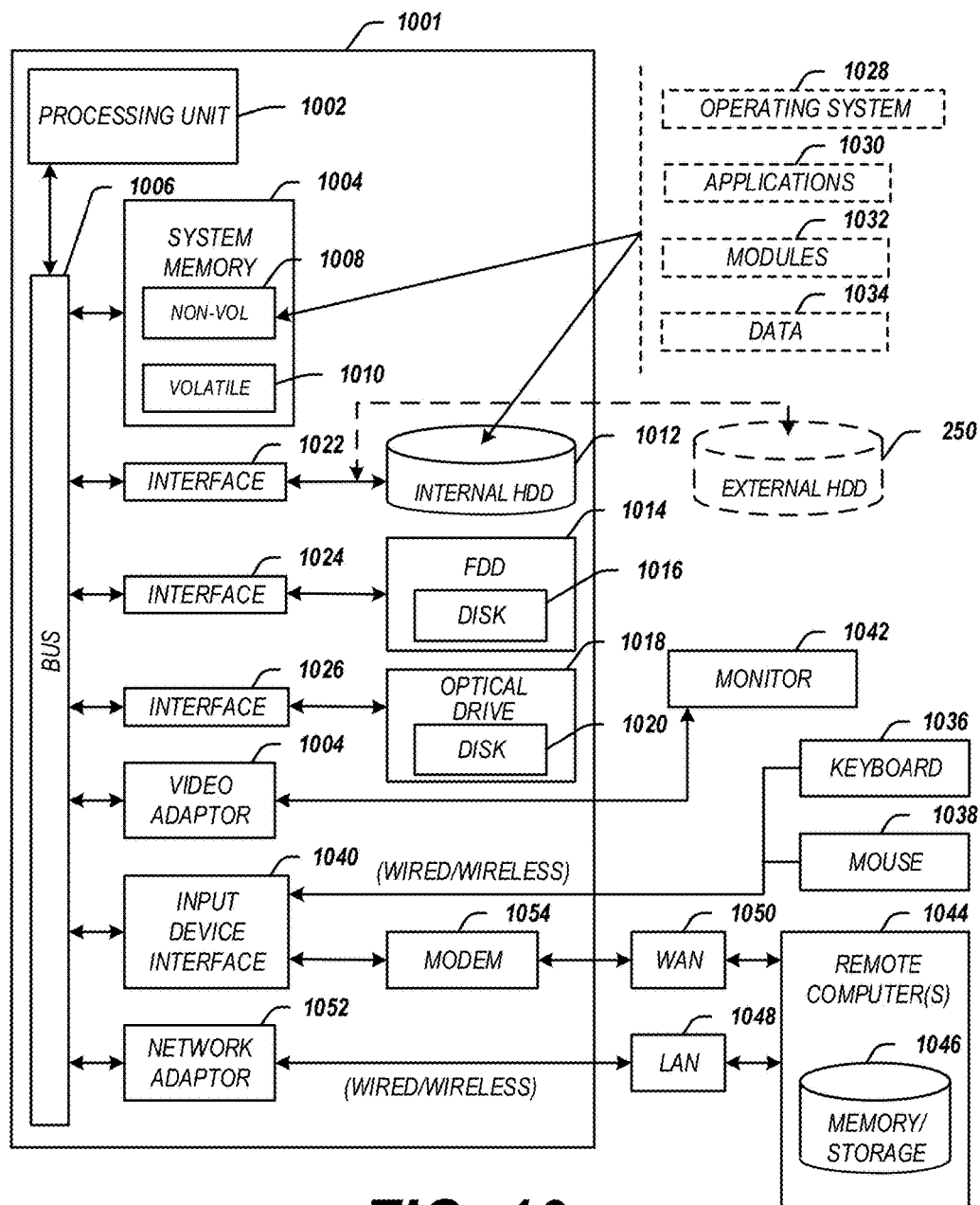
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
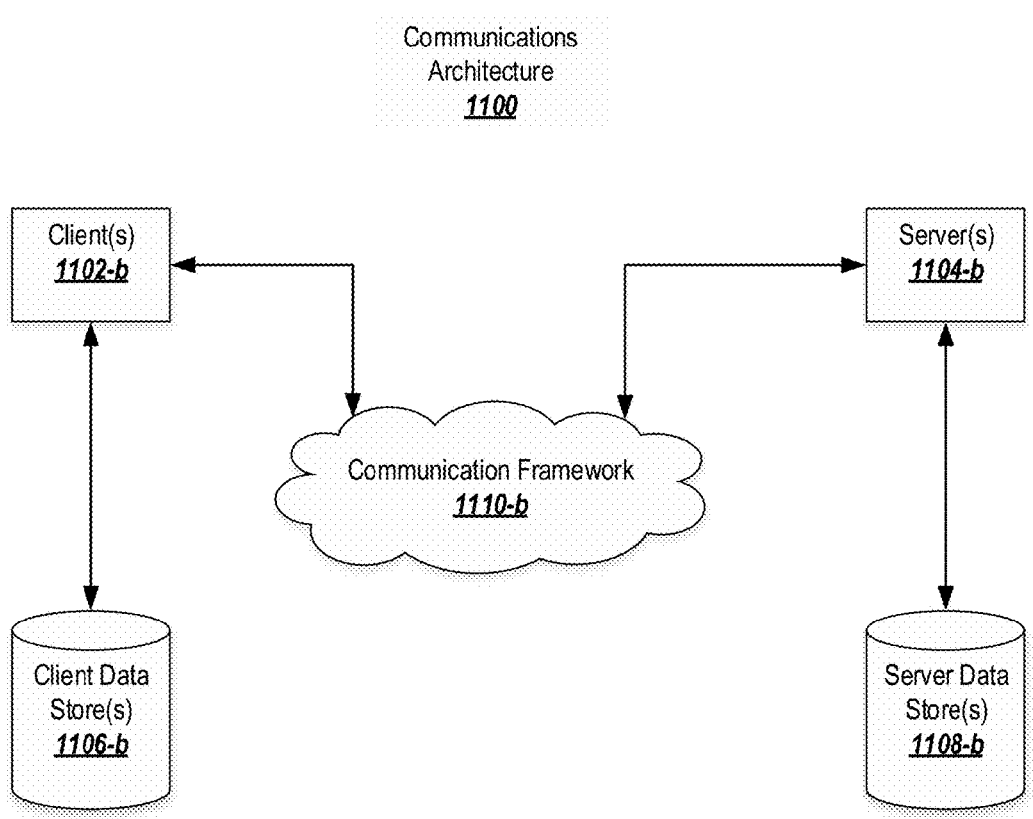
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
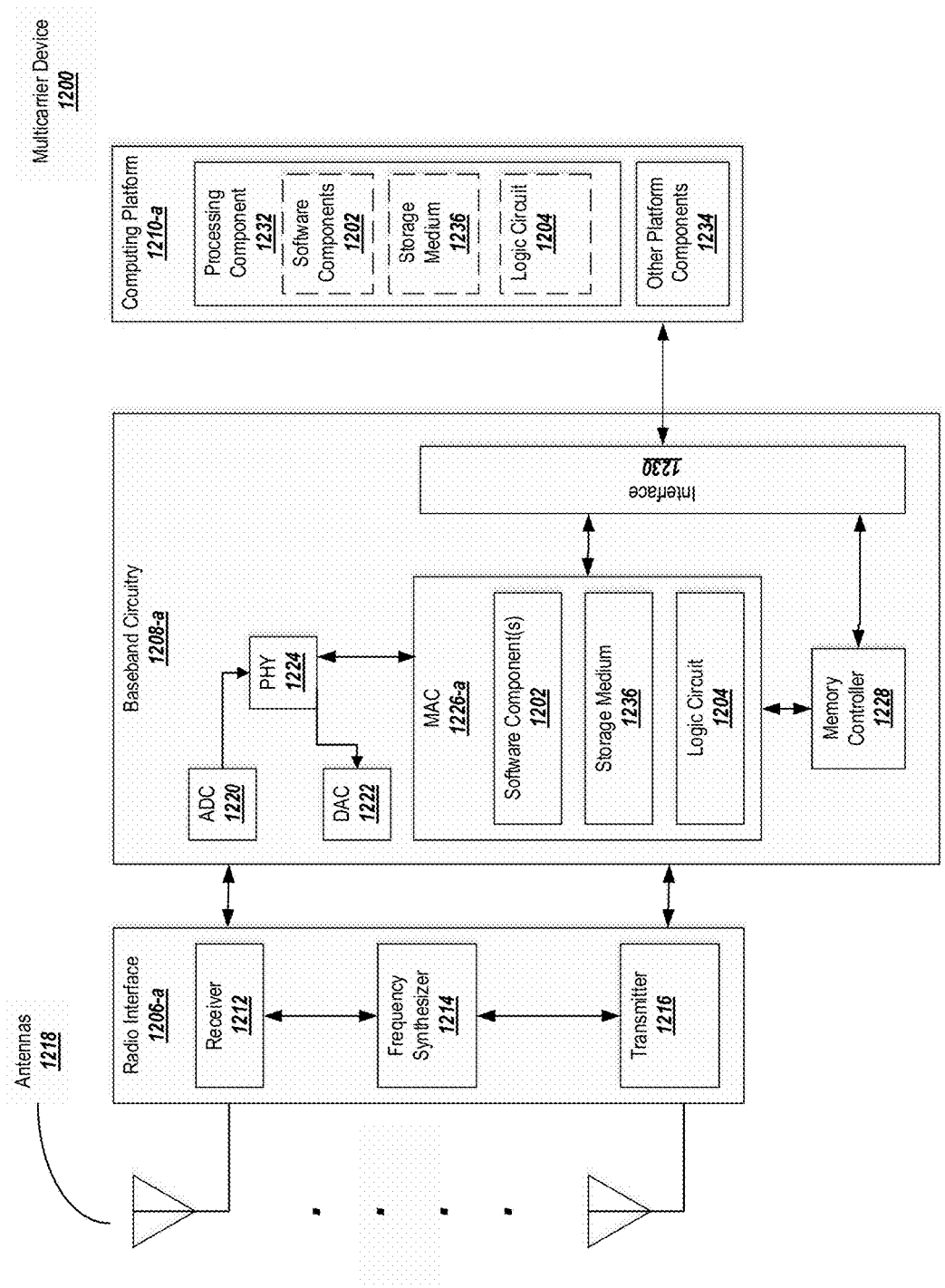
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multicarrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
    receiving an input from a messaging client at a messaging system on a messaging server, the input received based on information entered in a one-on-one message composition display;
    analyzing the input and information associated with the input to determine that the input is associated with an intent to produce content, wherein an intent to produce content comprises an intent to create a new group message or thread;
    in response to determining that the input is associated with an intent to produce content, transmitting an instruction to the messaging client to display a pivot interface element within the one-on-one message composition display;
    receiving a selection from the messaging client of the pivot interface element, the selection indicating an intent to switch from composing a one-on-one message or thread to a group message or thread; and
    creating a group message in response to selection of the pivot interface element.

2. The method of claim 1, further comprising analyzing information associated with the input to determine whether the intent to produce content is an intent to produce content for a group message or an intent to produce content for a one-to-one message.

3. The method of claim 1, wherein analyzing the information associated with the input comprises identifying a type of a request included in the input, the type comprising at least one of: a request to access a group tab, a request to compose a message, a request to access a thread having at least one unread message, a request to access a thread from a push notification, a request to reply to a previous message, a request to search for a contact, or a request to search for a message.

4. The method of claim 1, wherein analyzing the information associated with the input comprises analyzing content of the input for at least one of: whether the input comprises a question, whether the input comprises a response to a question, or a length of the content.

5. The method of claim 1, wherein analyzing the information associated with the input comprises analyzing a history of messages sent by a sender of the input or analyzing a relationship between a sender of the input and a recipient of the input.

6. The method of claim 1, wherein creating the group message comprises at least one of: generating a new thread ID for the group message, adding a new user to a current thread ID, or searching for an existing thread ID associated with participants in the group message.

7. The method of claim 1, further comprising automatically determining a group of suggested users to participate in the group message, and transmitting an instruction to display the group of suggested users.

8. A non-transitory computer-readable medium storing instructions, the instructions comprising instructions to:
    receive an input from a messaging client at a messaging system on a messaging server, the input received based on information entered in a one-on-one message composition display;
    analyze the input and information associated with the input to determine that the input is associated with an intent to produce content, wherein an intent to produce content comprises an intent to create a new group message or thread;
    in response to determining that the input is associated with an intent to produce content, transmit an instruction to the messaging client to display a pivot interface element within the one-on-one message composition display;
    receive a selection from the messaging client of the pivot interface element, the selection indicating an intent to switch from composing a one-on-one message or thread to a group message or thread;
    analyze information associated with the input to automatically identify a plurality of suggested users to participate in the group message; and
    transmit identifiers for the plurality of suggested group users to a source of the input.

9. The medium of claim 8, comprising instructions to select a predefined group of users that are associated with the input as the plurality of suggested users.

10. The medium of claim 8, comprising instructions to select a group of users having a shared affinity for a topic addressed in the input.

11. The medium of claim 8, wherein the input the instructions to analyze the information associated with the input comprise at least one of instructions to analyze content of the group message, or instruction to analyze a list of current recipients of the group message.

12. The medium of claim 8, wherein the group message is sent by an originator through a messaging service, and further comprising instructions to perform at least one of an analysis of historical messages sent by the originator on the messaging service, or an analysis of messages sent by the originator via a mobile device service distinct from the messaging service.

13. The medium of claim 8, comprising instructions to determine whether to associate the group message with a new message thread or to add the group message to an existing message thread.

14. The method of claim 8, comprising instructions to determine whether the input is associated with an intent to produce content or an intent to consume content, the instructions comprising:
calculating a productive score and a consumptive score used to indicate whether the intent of the input is more productive or more consumptive; and
comparing the productive and consumptive scores to determine which score is higher.

15. An apparatus comprising:
a non-transitory computer-readable medium storing logic; and
a hardware processor circuit configured to execute the stored logic, the logic configured to cause the processor to:
provide a network interface component configured to receive an input, the input received based on information entered in a one-on-one message composition display;
provide an intent determination component configured to:
analyze information associated with the input to determine that the input is associated with an intent to produce content, wherein an intent to produce content comprises an intent to create a new group message or thread;
in response to determining that the input is associated with an intent to produce content, transmit an instruction to the messaging client to display a pivot interface element within the one-on-one message composition display; and
receive a selection from the messaging client of the pivot interface element, the selection indicating an intent to switch from composing a one-on-one message or thread to a group message or thread;
provide messaging logic configured to create a group message in response to a request from the intent determination component; and
provide a group selection component configured to:
analyze information associated with the input to automatically identify a plurality of suggested users to participate in the group message; and
transmit identifiers for the plurality of suggested group users to a source of the input.

16. The apparatus of claim 15, the intent determination component to determine whether the input is associated with an intent to produce content for a group or content for an individual.

17. The apparatus of claim 15, the intent determination component to analyze at least one of a type of the input, content associated with the input, a history of messages sent by the source of the input, or a relationship between the source of the input and an identified recipient of the input.

18. The apparatus of claim 15, the group selection component to select a predefined group, users having a shared affinity, users selected based on content associated with the input, or users selected based on an analysis of current identified recipients of the input.

19. The apparatus of claim 15, the group selection component to identify the plurality of suggested users based on at least one of a historical message analysis, or a historical mobile data analysis.

20. The apparatus of claim 15, the messaging logic to determine whether to assign the group message to a new messaging thread or an existing messaging thread.

* * * * *